(12) United States Patent
Okabe et al.

(10) Patent No.: US 10,017,240 B2
(45) Date of Patent: Jul. 10, 2018

(54) AIRCRAFT

(71) Applicant: MITSUBISHI AIRCRAFT CORPORATION, Aichi (JP)

(72) Inventors: Yoshinori Okabe, Aichi (JP); Kenya Ishihara, Aichi (JP); Zenta Sugawara, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 139 days.

(21) Appl. No.: 14/850,505

(22) Filed: Sep. 10, 2015

(65) Prior Publication Data

US 2016/0107744 A1    Apr. 21, 2016

(30) Foreign Application Priority Data

Oct. 15, 2014   (JP) .................................. 2014-210988

(51) Int. Cl.
  *B64C 9/22*    (2006.01)
  *B64C 9/16*    (2006.01)

(52) U.S. Cl.
  CPC . *B64C 9/22* (2013.01); *B64C 9/16* (2013.01)

(58) Field of Classification Search
  CPC ................ B64C 9/14; B64C 9/16; B64C 9/22
  See application file for complete search history.

(56) References Cited

U.S. PATENT DOCUMENTS

| 2,791,385 | A | * | 5/1957 | Johnson | ..... B64C 3/58 244/113 |
|---|---|---|---|---|---|
| 4,566,657 | A | * | 1/1986 | Grow | ..... B64C 9/20 244/113 |
| 5,094,412 | A | * | 3/1992 | Narramore | ..... B64C 3/50 244/130 |
| 5,655,737 | A | * | 8/1997 | Williams | ..... B64C 9/00 244/212 |
| 5,895,015 | A | * | 4/1999 | Saiz | ..... B64C 9/18 244/215 |
| 6,152,404 | A | * | 11/2000 | Flaig | ..... B64C 9/24 244/130 |
| 9,586,672 | B2 | * | 3/2017 | Isotani | ..... B64C 9/18 |
| 2015/0053825 | A1 | * | 2/2015 | Isotani | ..... B64C 9/18 244/213 |

FOREIGN PATENT DOCUMENTS

JP           5830086       * 12/2014
WO      2013/145774 A1     10/2013

* cited by examiner

*Primary Examiner* — Justin M Benedik
(74) *Attorney, Agent, or Firm* — Pearne & Gordon LLP

(57) ABSTRACT

The present invention provides an aircraft including: a main wing; and a flight control surface that is deployed from the main wing in a first direction and in a second direction different from the first direction. In the aircraft, an end surface of the flight control surface facing the main wing when the flight control surface is not deployed is inclined with respect to the first direction or the second direction on at least one side of a longitudinal direction of the flight control surface, and a portion of the main wing facing the end surface is also inclined with respect to the first direction or the second direction in accordance with the end surface.

20 Claims, 21 Drawing Sheets

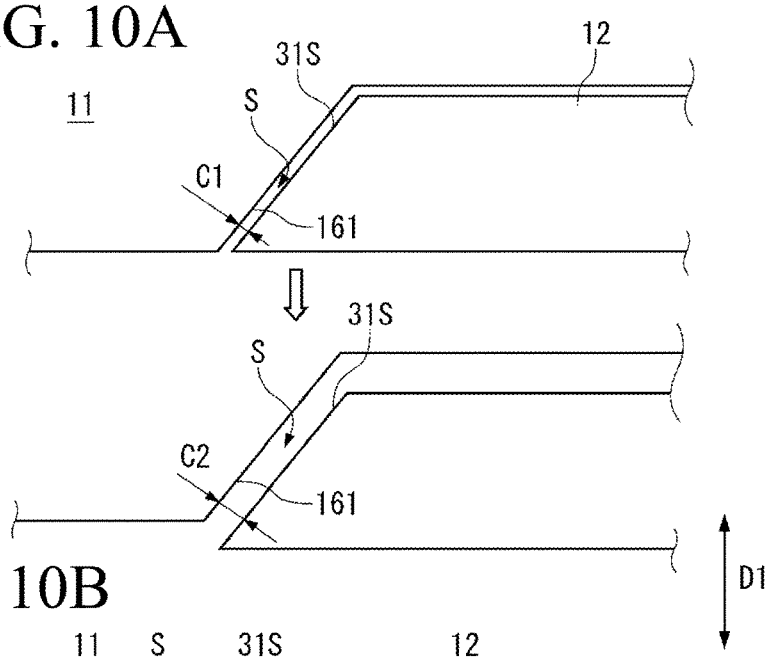
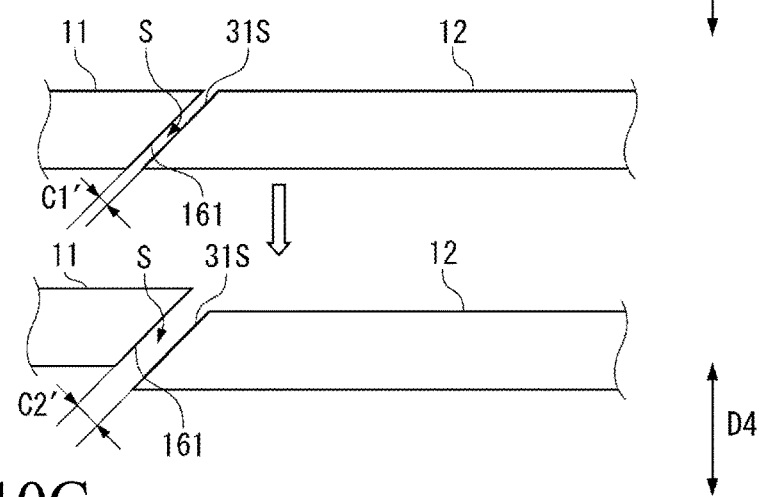
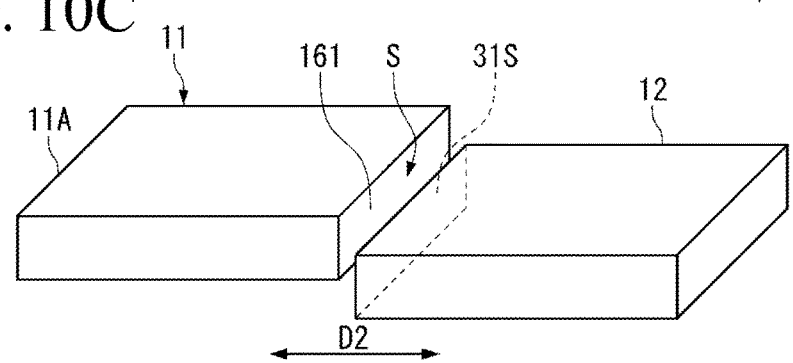

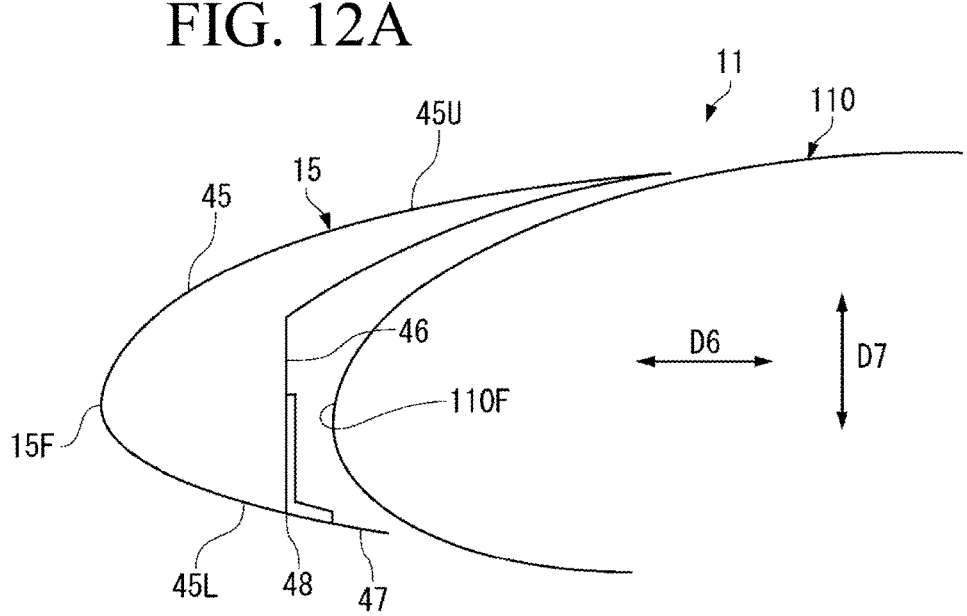
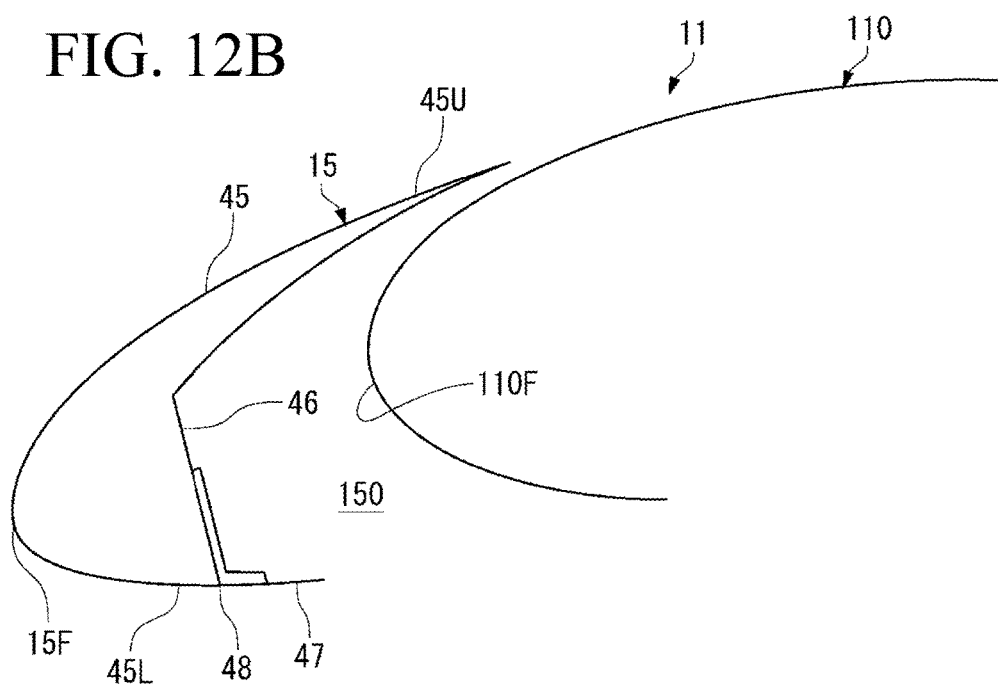

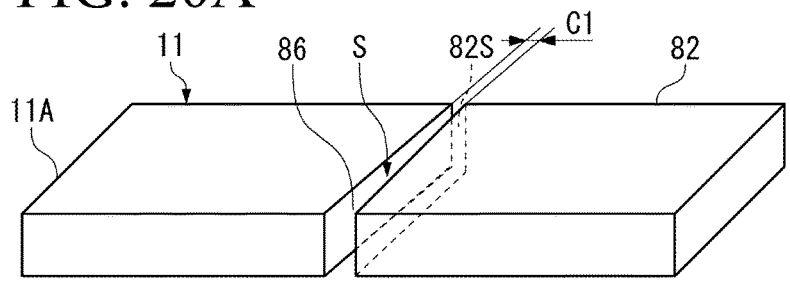
FIG. 20A
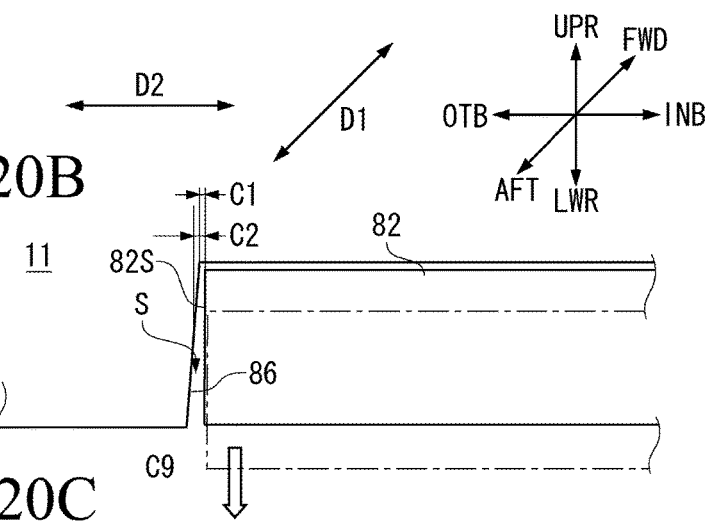
FIG. 20B
FIG. 20C
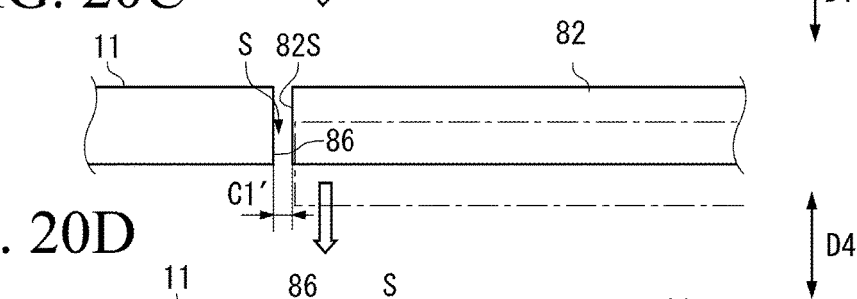
FIG. 20D
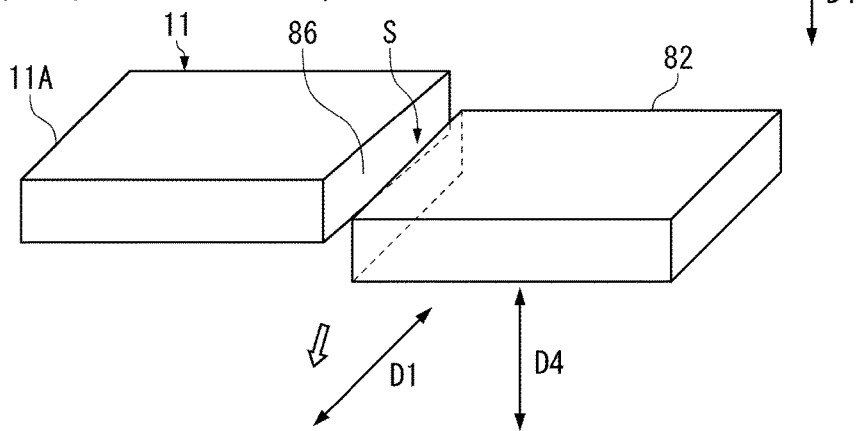

＃ AIRCRAFT

BACKGROUND OF THE INVENTION

Field of the Invention

The present invention relates to a flight control surface that is deployed from a main wing of an aircraft to generate high lift.

Description of the Related Art

A flap is provided as a high-lift device at a trailing edge of a main wing of an aircraft. The flap is deployed backward and downward during takeoff and landing to generate necessary lift (for example, see International Publication No. WO2013/145774).

The flap is guided along a track rail provided in the main wing to be deployed backward and downward. When the aircraft is cruising, the flap is guided in a direction opposite to that of the deployment along the track rail to be stored in a storage portion of the main wing.

An end rib located at a longitudinal end portion of the flap is arranged along a direction in which the flap is reciprocated between a deployed state and a stored state. An end surface of the flap formed by the end rib is perpendicular to a direction of a wingspan that is a distance between a tip of a left main wing and a tip of a right main wing (International Publication No. WO2013/145774).

A clearance is set between the end surface of the flap and an inner wall of the storage portion facing the end surface of the flap. The clearance is sealed by a rubber seal provided in the storage portion.

However, even when the clearance is set, the end surface of the flap and the inner wall of the storage portion possibly interfere with each other during a moving process of the flap due to assembly tolerance or vibration during a flight. If the clearance is widened in order to avoid the interference, it becomes difficult to ensure stiffness of the rubber seal that seals the wide clearance.

A slat that is provided at a leading edge of the main wing and deployed during takeoff and landing also has the above problems. That is, even when a clearance is set between an end surface of the slat and a portion of the main wing facing the end surface of the slat, the end surface of the slat and the portion of the main wing possibly interfere with each other during a moving process of the slat due to assembly tolerance or vibration during a flight.

In view of the problems described above, an object of the present invention is to provide an aircraft in which operational reliability of a flap and a slat is improved.

SUMMARY OF THE INVENTION

An aircraft of the present invention includes: a main wing; and a flight control surface that is deployed from the main wing in a first direction and in a second direction different from the first direction.

In the present invention, an end surface of the flight control surface facing the main wing when the flight control surface is not deployed is inclined with respect to the first direction or the second direction on at least one side of a longitudinal direction of the flight control surface, and a portion of the main wing facing the end surface is also inclined with respect to the first direction or the second direction in accordance with the end surface.

When the end surface of the flight control surface and the portion of the main wing facing the end surface are inclined with respect to the first direction or the second direction, a clearance between the end surface of the flight control surface and the portion of the main wing is gradually widened in association with movement of the flight control surface in the deployment.

In accordance with the present invention, even when dimensions of the clearance when the flight control surface is not deployed are not excessively increased in consideration of assembly tolerance or vibration displacement during a flight of the flight control surface and the main wing, a wider clearance than that in the non-deployment is ensured between the end surface of the flight control surface and the portion of the main wing when the flight control surface performs a deployment operation. The clearance absorbs the assembly tolerance or the vibration displacement, so that operational reliability of the flight control surface can be improved by preventing interference between the end surface and the portion of the main wing during a moving process of the flight control surface.

In accordance with the present invention, the clearance between the end surface of the flight control surface and the portion of the main wing can be set to be as small as possible without considering a margin for avoiding the interference between the end surface of the flight control surface and the portion of the main wing. By decreasing the clearance, air resistance can be suppressed, and noise due to the air resistance can be reduced.

In the aircraft of the present invention, the end surface of the flight control surface may be inclined with respect to both of the first direction and the second direction, and the portion of the main wing facing the end surface may preferably be also inclined with respect to both of the first direction and the second direction in accordance with the end surface.

When the end surface of the flight control surface is inclined with respect to both of the first direction and the second direction, a wider clearance can be ensured between the end surface of the flight control surface and the portion of the main wing with respect to the same moving distance of the flight control surface in the deployment as compared to the case in which the end surface of the flight control surface is inclined with respect to only one of the directions. Therefore, it is possible to more surely prevent the interference between the end surface and the portion of the main wing. Also, by further decreasing the clearance, air resistance can be further suppressed, and noise due to the air resistance can be further reduced.

In the aircraft of the present invention, a connecting portion between the end surface of the flight control surface inclined with respect to the second direction and a lower surface side of the main wing in the flight control surface is preferably chamfered.

When the flight control surface is deployed, the end surface of the flight control surface constitutes a wingtip. At the wingtip, an airflow directed to an upper surface side from the lower surface side of the flight control surface via the end surface based on a pressure difference between the upper surface side and the lower surface side can be guided in a direction along the upper surface by the inclined end surface and the chamfered portion interposed between the upper surface and the lower surface of the flight control surface. Fluid energy is thereby supplied to a boundary layer between the upper surface and the airflow, and separation of the boundary layer can be suppressed. Thus, a large pressure difference can be ensured between the upper side and the lower side of the flight control surface based on a flow on the upper surface side and a flow on the lower surface side, and high lift can be surely generated.

Another aircraft of the present invention includes: a main wing; and a flight control surface that is deployed from the main wing in a first direction and in a second direction different from the first direction, wherein only one of an end surface of the flight control surface facing the main wing when the flight control surface is not deployed and a portion of the main wing facing the end surface is inclined with respect to the first direction or the second direction on at least one side of a longitudinal direction of the flight control surface.

By employing the above configuration, a clearance between the end surface of the flight control surface and the portion of the main wing is also gradually widened with regard to the first direction or the second direction to which one of the flight control surface and the portion of the main wing is inclined in association with movement of the flight control surface in the deployment.

Therefore, even when dimensions of the clearance when the flight control surface is not deployed are not excessively increased in consideration of assembly tolerance or vibration displacement during a flight of the flight control surface and the main wing, a wider clearance than that in the non-deployment is ensured between the end surface of the flight control surface and the portion of the main wing when the flight control surface performs a deployment operation. The clearance absorbs the assembly tolerance or the vibration displacement, so that operational reliability of the flight control surface can be improved by preventing interference between the end surface of the flight control surface and the portion of the main wing during a moving process of the flight control surface.

In accordance with the present invention, the clearance between the end surface of the flight control surface and the portion of the main wing can be set to be as small as possible without considering a margin for avoiding the interference between the end surface of the flight control surface and the portion of the main wing. By decreasing the clearance, air resistance can be suppressed, and noise due to the air resistance can be reduced.

The present invention can be suitably applied to a flap that is deployed from the main wing in the first direction and the second direction.

That is, in the aircraft of the present invention, the flight control surface may be a flap, the first direction may be a direction from a nose side to a tail side of the aircraft, and the second direction may be a direction from an upper surface side to a lower surface side of the main wing.

Regarding the above flap, it is preferable that the end surface of the flap is inclined with respect to both of the first direction and the second direction, the portion of the main wing facing the end surface is also inclined with respect to both of the first direction and the second direction in accordance with the end surface, and an inclination angle $\theta 2$ of the end surface and the portion with respect to the second direction is larger than an inclination angle $\theta 1$ of the end surface and the portion with respect to the first direction.

When the inclination angle $\theta 2$ with respect to the second direction is larger than the inclination angle $\theta 1$ with respect to the first direction, the clearance between the end surface of the flap and the facing portion of the main wing is sufficiently widened with regard to the second direction even in a range in which a displacement amount in the second direction is smaller than a displacement amount in the first direction in a track of the flap. Thus, the interference between the end surface and the facing portion can be avoided by ensuring the wide clearance therebetween.

The present invention can be suitably applied to a slat that is deployed from the main wing in the first direction and the second direction.

That is, in the aircraft of the present invention, the flight control surface may be a slat, the first direction may be a direction from a tail side to a nose side of the aircraft, and the second direction may be a direction from an upper surface side to a lower surface side of the main wing.

The inclined end surface of the flight control surface in the present invention may be formed by an end rib that is arranged at an end portion in the longitudinal direction of the flight control surface.

Accordingly, only by changing a shape and a direction of the end rib from those of a conventional end rib, the inclined end surface can be easily formed.

The inclined end surface of the flight control surface in the present invention may be formed to be flat without providing a member projecting from the end surface.

"Flat" means that no member projecting from the end surface is arranged. Examples of the member projecting from the end surface include a projection that is provided on the end surface of the flight control surface and a projection that is received into a recessed portion that is formed on the end surface of the flight control surface.

Since no member disturbing an airflow is arranged on the end surface, air resistance can be suppressed, and noise due to the air resistance can be reduced. Particularly, during landing in which engine power is reduced, a ratio of noise generated by the flight control surface to total noise generated by the aircraft is increased. Thus, a larger effect is produced by reducing the noise.

In accordance with the present invention, since it is possible to prevent the flight control surface provided on the main wing and deployed in the first direction and the second direction from interfering with the portion of the main wing, the operational reliability of the flight control surface can be improved.

BRIEF DESCRIPTION OF THE DRAWINGS

FIGS. 9A-9D are schematic views illustrating a conventional example for comparison with the first embodiment in which FIGS. 9A and 9D are perspective views of a flap and a storage portion, FIG. 9B is a plan view thereof, and FIG. 9C is a side view thereof;

FIGS. 10A-10C are schematic views illustrating displacement of the flap in deployment in the first embodiment in which FIG. 10A is a plan view, FIG. 10B is a side view, and FIG. 10C is a perspective view illustrating a configuration for comparison with the first embodiment;

FIG. 12A is a view illustrating a retracted state of a slat according to a second embodiment and FIG. 12B is a view illustrating a deployed state of the slat;

FIGS. 15A and 15B are schematic views illustrating displacement of the slat in deployment in which FIG. 15A is a plan view and FIG. 15B is a side view;

FIGS. 18A-18C are views illustrating a modification of the present invention in which FIG. 18A is a perspective view of a flap, FIG. 18B is a side view of the flap, and FIG. 18C is a side view according to a conventional example;

FIGS. 20A-20D are views illustrating another embodiment of the present invention.

DETAILED DESCRIPTION OF THE PREFERRED EMBODIMENTS

In the following, embodiments of the present invention will be described by reference to the accompanying drawings.

First Embodiment

Figure 1:
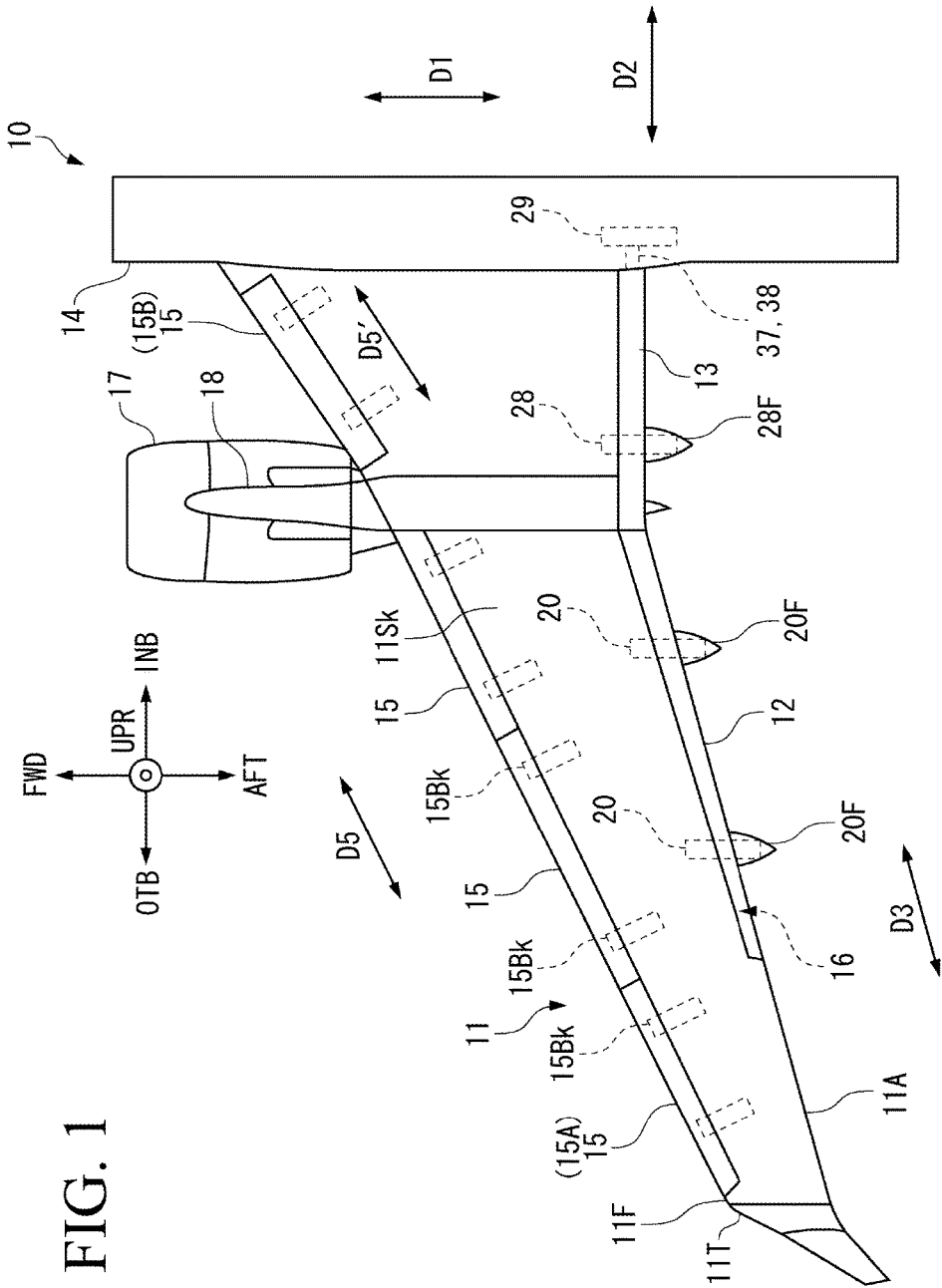
FIG. 1 is a plan view illustrating a main wing on which a flap according to a first embodiment is provided.

A main wing 11 of an aircraft 10 shown in FIG. 1 includes an outboard flap 12 and an inboard flap 13 as a high-lift device at a trailing edge 11A. FIG. 1 shows the main wing 11 provided on a left side of a fuselage 14 of the aircraft 10. A main wing provided on a right side of the fuselage 14 also includes the outboard flap 12 and the inboard flap 13 symmetrically to the main wing 11 shown in FIG. 1.

The main wing 11 includes a plurality of slats 15 at a leading edge 11F. The slats 15 will be described in a second embodiment.

In the following, a direction along an axial line set in the fuselage 14 is defined as an aircraft axis direction D1. In the aircraft axis direction D1, a nose side and a tail side of the aircraft 10 are referred to as "forward" and "aft", respectively.

A distance between a tip 11T of the left main wing 11 and a tip of the right main wing (not shown) is referred to as a wingspan (also referred to as a wingspread). A direction of the wingspan is defined as a span direction D2. The aircraft axis direction D1 and the span direction D2 are perpendicular to each other. On each of the right and left sides of the fuselage 14, the fuselage 14-side of the span direction D2 is referred to as an inboard side, and an opposite side thereof is referred to as an outboard side.

Moreover, an upper surface side and a lower surface side of the main wing 11 are referred to as "upper" and "lower", respectively.

Note that the "forward" is represented as "FWD", the "aft" "AFT", the "upper" "UPR", the "lower" "LWR", the "inboard side" "INB", and the "outboard side" "OTB" in the respective drawings.

[Configuration of the Main Wing]

The main wing 11 has a box structure including a plurality of ribs that are arranged at intervals in the span direction D2, spars that are arranged on the forward and aft sides of the main wing 11 to connect the plurality of ribs, the leading edge 11F and the trailing edge 11A that are provided at the forward and aft spars, skins 11Sk (only a skin on the upper surface side is shown) that are arranged on the upper and lower sides of the main wing 11 and supported by the ribs and the spars, and a plurality of stringers that are provided on a back side of each of the upper and lower skins. The main wing 11 is formed in a thin aerofoil profile. The box structure of the main wing 11 is omitted in the drawings.

The main wing 11 has a predetermined sweepback angle. The trailing edge 11A of the main wing 11 extends along the span direction D2 from the fuselage 14, and extends diagonally backward so as to be inclined with respect to the span direction D2 from a position of an engine pylon 18 that fixes an engine 17 to the main wing 11.

The inboard flap 13 is arranged in a zone on the inboard side of the trailing edge 11A extending along the span direction D2. The outboard flap 12 is arranged in a zone on the outboard side of the trailing edge 11A extending so as to be inclined with respect to the span direction D2.

[Configuration of the Flap]

The outboard flap 12 and the inboard flap 13 are deployed in order to obtain high lift during slow flight such as takeoff and landing. The outboard flap 12 and the inboard flap 13 are stored in a storage portion 16 that is prepared in the main wing 11 during cruising at high speed.

When the outboard flap 12 and the inboard flap 13 are not deployed (in non-deployment) as shown in FIG. 1, the outboard flap 12 and the inboard flap 13 are flush with the trailing edge 11A of the main wing 11, and constitute a portion of the main wing 11. At this time, the outboard flap 12 and the inboard flap 13 are stored within the storage portion 16 of the main wing 11.

[Configuration of the Outboard Flap]

Figure 2:
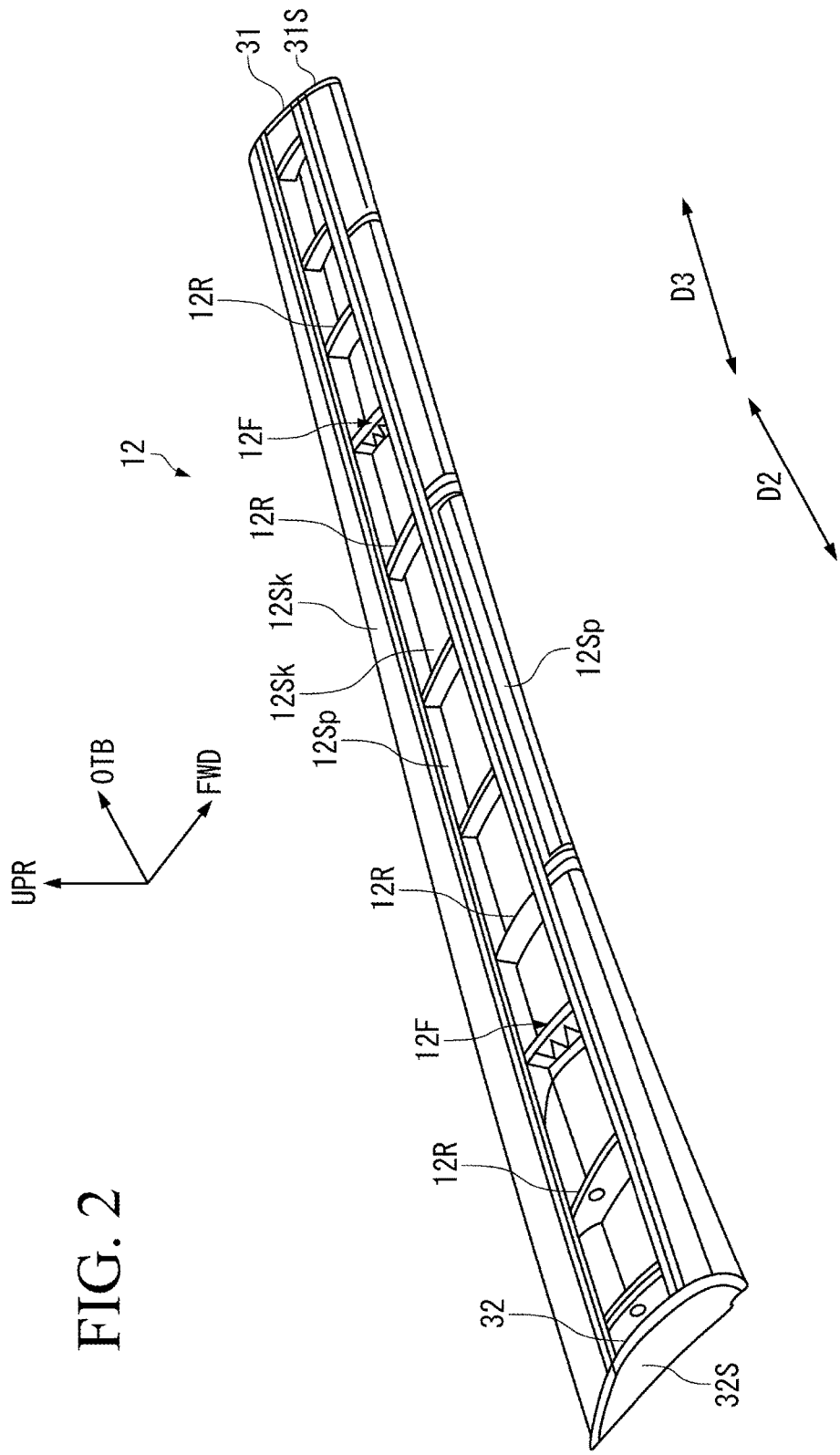
FIG. 2 is a perspective view of an outboard flap.

As shown in FIG. 2, the outboard flap 12 has a box structure similar to that of the main wing 11, and includes a plurality of ribs 12R, spars 12Sp that are arranged on the forward and aft sides, and skins 12Sk that are arranged on the upper and lower sides. FIG. 2 shows an inner portion of the flap 12 by removing some of a plurality of panels constituting the upper skin 12Sk.

The outboard flap 12 extends along a direction in which the trailing edge 11A (FIG. 1) extends (a direction inclined with respect to the span direction D2). The direction is referred to as a longitudinal direction D3 of the outboard flap 12. The plurality of ribs 12R are arranged at intervals in the longitudinal direction D3.

In the following, a rib arranged on the most outboard side out of the plurality of ribs 12R is referred to as an end rib 31, and a rib arranged on the most inboard side is referred to as an end rib 32. The ribs 12R other than the end ribs 31 and 32 extend along a direction perpendicular to the longitudinal direction D3. Directions of the end ribs 31 and 32 will be described later.

The end rib 31 forms an end surface 31S on the outboard side of the outboard flap 12. The end rib 32 forms an end surface 32S on the inboard side of the outboard flap 12.

Figure 3:
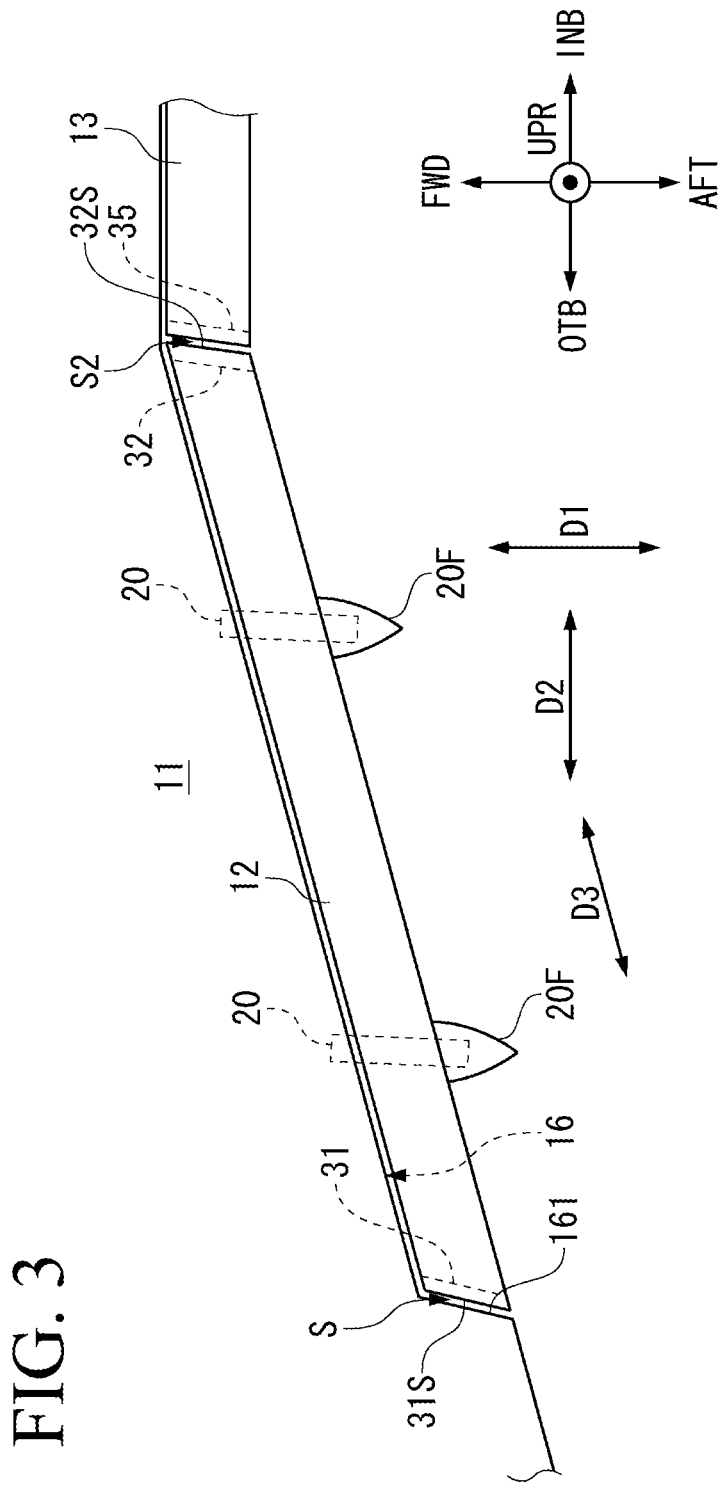
FIG. 3 is a plan view illustrating the outboard flap and a storage portion of the main wing.

The end rib 31 on the outboard side faces an inner wall 161 formed in the storage portion 16 of the main wing 11 as shown in FIG. 3. A clearance S between the end rib 31 and the inner wall 161 is sealed by a rubber seal (not shown) fixed to the inner wall 161.

The end rib 32 on the inboard side faces an end rib 35 of the inboard flap 13. A clearance S2 between the end ribs 32 and 35 is sealed by a rubber seal 34 (FIG. 4B) fixed to the end rib 35.

The clearance S between the end rib 31 and the inner wall 161, and the clearance S2 between the end ribs 32 and 35 are preferably as small as possible in order to suppress air resistance and in view of sufficiently sealing the clearances by the rubber seals.

Since the clearance S is sealed by the rubber seal and the clearance S2 is sealed by the rubber seal 34, an increase in air resistance due to airflow disturbances around the clearances is prevented.

Figure 5:
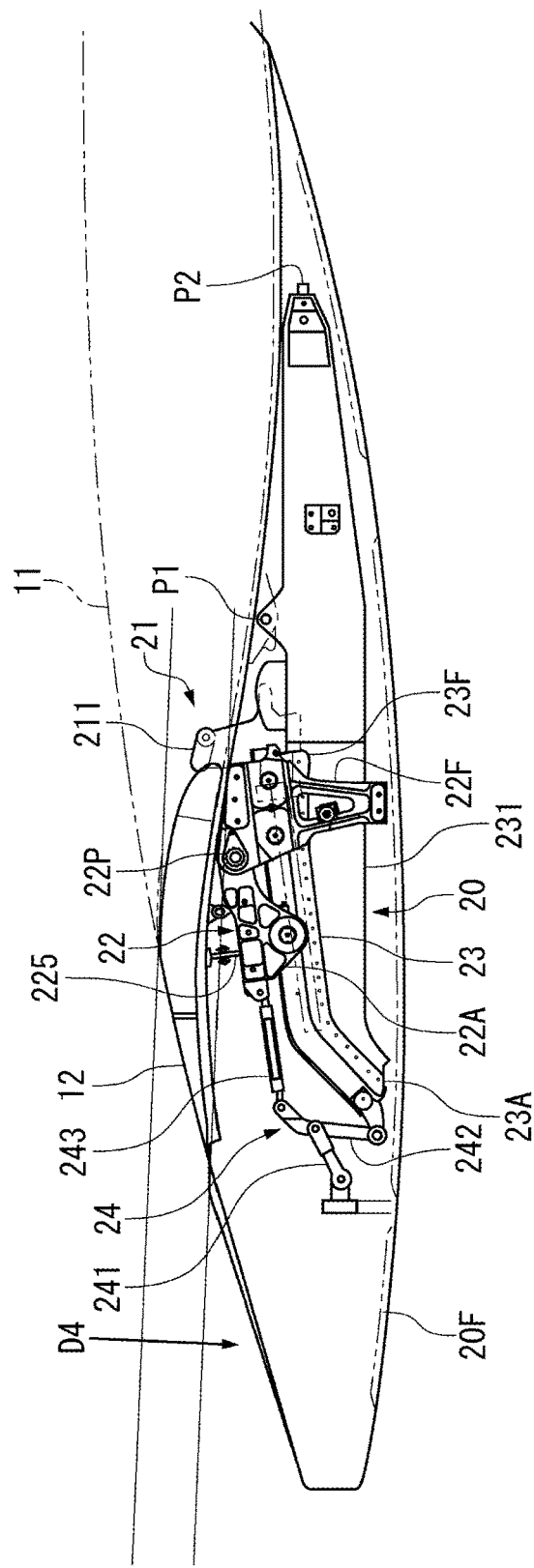
FIG. 5 is a view illustrating a stored state of the flap.
Figure 6:
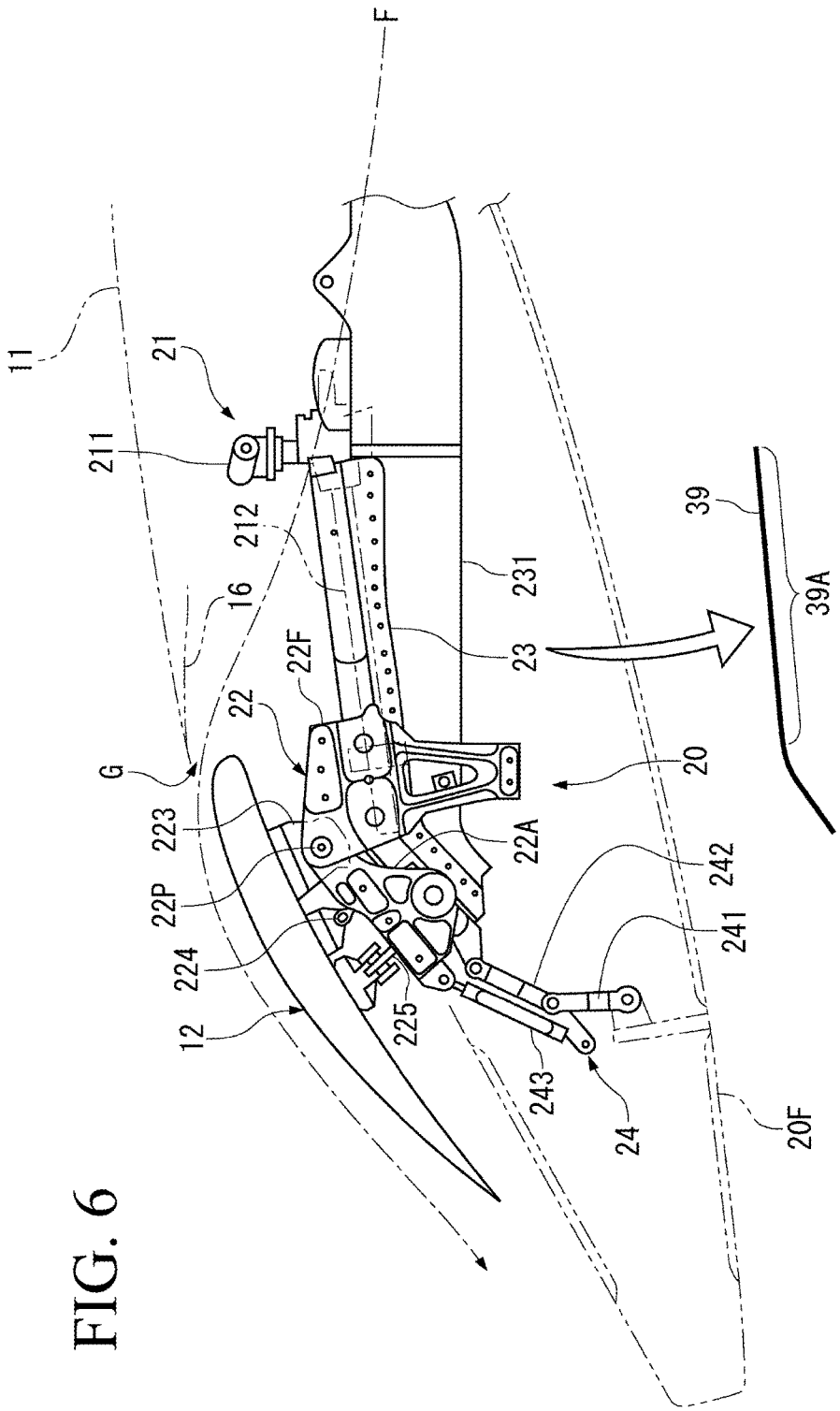
FIG. 6 is a view illustrating a deployed state of the flap.

The outboard flap 12 is supported at two positions by two deployment devices 20 as shown in FIG. 1. The deployment devices 20 deploy the outboard flap 12 backward and downward as shown in FIG. 6, and store the outboard flap 12 in the storage portion 16 as shown in FIG. 5 when it is not necessary to generate high lift. Both the two deployment devices 20 are provided in the main wing 11. The deployment devices 20 partially project backward from the main wing 11. A projecting portion of each of the deployment devices 20 is covered with a fairing 20F.

[Configuration of the Inboard Flap]

The inboard flap 13 is supported at two positions by a deployment device 28 provided in the main wing 11, and a deployment device 29 provided in the fuselage 14 as shown in FIG. 1. The deployment devices 28 and 29 deploy the inboard flap 13 backward and downward, and store the inboard flap 13 in the storage portion 16. The deployment device 28 partially projects backward from the main wing 11, and a projecting portion is covered with a fairing 28F. The entire deployment device 29 is stored within the fuselage 14. Since the inboard side of the inboard flap 13 is supported by the deployment device 29 that can be stored in the fuselage 14, air resistance can be reduced as compared to a case in which two deployment devices 28 are provided in the main wing 11.

Figure 4:
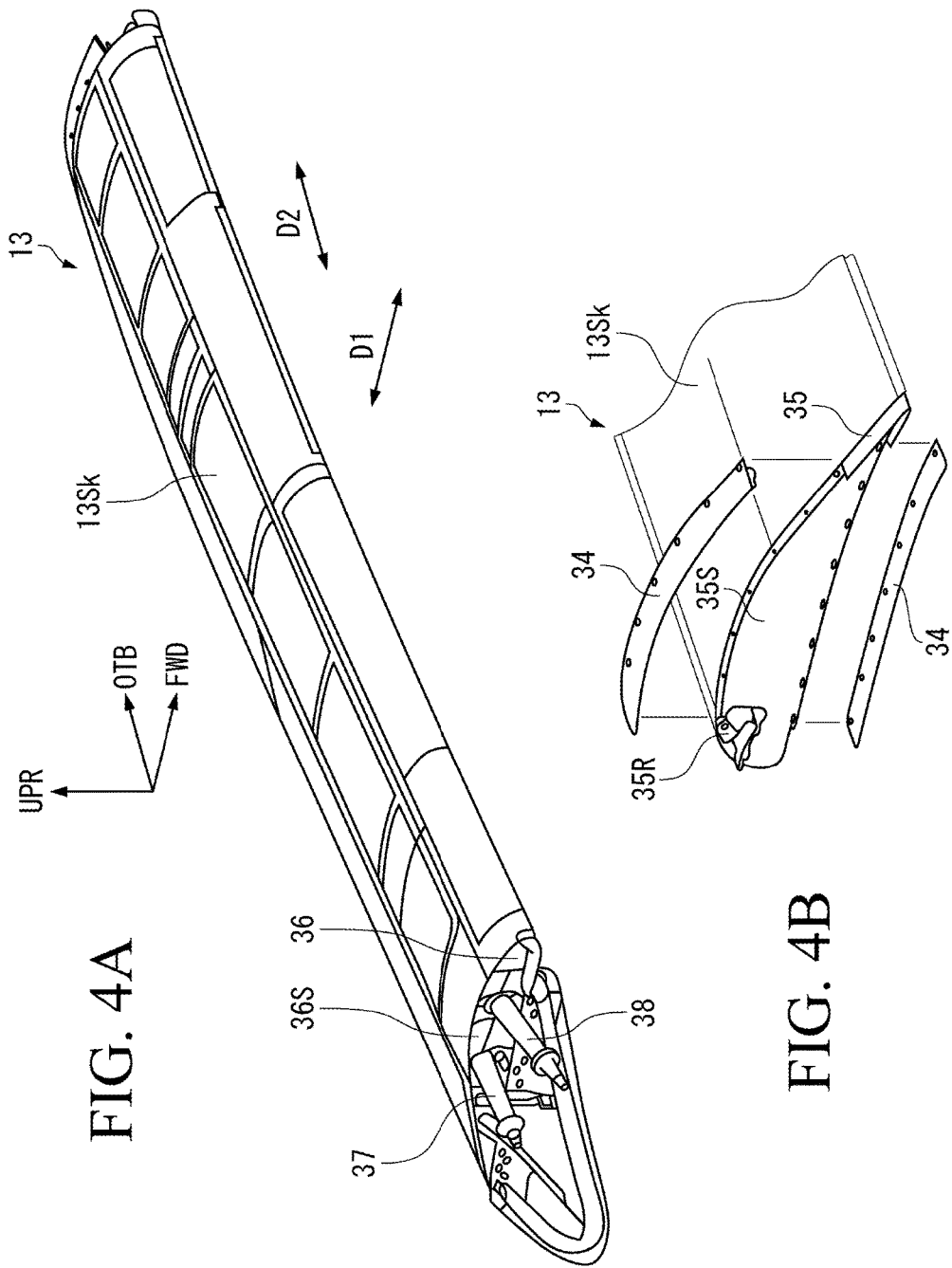
FIG. 4A is a perspective view of an inboard flap and FIG. 4B is a view illustrating an end rib on an outboard side of the inboard flap.

The inboard flap 13 shown in FIG. 4A includes a plurality of ribs, spars that are arranged on the forward and aft sides, and skins 13Sk to have a box structure as in the outboard flap 12. The inboard flap 13 extends along the span direction D2, and the ribs of the inboard flap 13 are arranged along the aircraft axis direction D1 perpendicular to the span direction D2.

Two projections 37 and 38 are provided on an end rib 36 on the inboard side of the inboard flap 13. The projections 37 and 38 rise from an end surface 36S of the inboard flap 13 formed by the end rib 36. Distal end portions of the projections 37 and 38 are connected to the deployment device 29 (FIG. 1).

A guide rib 35R is provided on the end rib 35 on the outboard side of the inboard flap 13 as shown in FIG. 4B. The guide rib 35R rises from an end surface 35S of the inboard flap 13 formed by the end rib 35. The guide rib 35R has a substantially U shape in which a forward end side is open, and the forward end side is widened. A rib holder (not shown) provided in the storage portion 16 is inserted into the guide rib 35R from the forward end side.

When the inboard flap 13 is deployed, the guide rib 35R moves backward to come out of the rib holder.

When the inboard flap 13 is stored, the rib holder is inserted into the guide rib 35R, so that the guide rib 35R is held by the rib holder. At this time, the rib holder is guided into the guide rib 35R from the widened forward end portion of the guide rib 35R. Thus, even when the deployed inboard flap 13 is displaced in association with deformation of the main wing 11 during a flight, the inboard flap 13 can be stored in a correct storage position.

The outboard flap 12 and the inboard flap 13 of the present embodiment are deployed at the same time, and stored at the same time. The clearance S2 between the end surface 35S of the inboard flap 13 and the end surface 32S of the outboard flap 12 is sealed by the strip-shaped rubber seal 34 fixed to each of an upper end and a lower end of the end rib 35.

[Configuration of the Deployment Device]

A configuration and an operation of the deployment devices 20 that deploy the outboard flap 12 out of the above deployment devices 20, 28, and 29 are described as an example. Configurations and operations of the deployment devices 28 and 29 are almost the same as those of the deployment devices 20.

As shown in FIGS. 5 and 6, each of the deployment devices 20 includes an actuator 21 having a driving source, a carriage unit 22 that transmits a driving force obtained from the actuator 21 to the outboard flap 12 supported by the carriage unit 22, a track rail 23 that guides the outboard flap 12 via the carriage unit 22, and a fairing link 24 that moves the fairing 20F along with an operation of the flap. The track rail 23 is arranged along the aircraft axis direction D1.

Note that a component corresponding to the carriage unit 22 is attached to the above projections 37 and 38 in the deployment device 29.

The actuator 21 includes an electric motor 211 as the driving source, and a screw driving unit 212 that converts a rotational driving force outputted from the electric motor 211 to a linear driving force. By switching rotational directions of the electric motor 211, a moving body (not shown) of the screw driving unit 212 is reciprocated.

The carriage unit 22 supports the outboard flap 12, and moves the outboard flap 12 between a storage position shown in FIG. 5 and a deployment position shown in FIG. 6.

The carriage unit 22 includes a forward carriage 22F and an aft carriage 22A that are rotatably connected to each other by a pin 22P. The forward carriage 22F and the aft carriage 22A are also arranged along the aircraft axis direction D1 similarly to the track rail 23.

The carriage unit 22 supports the outboard flap 12 via a plurality of connection fittings 223, 224, and 225 (FIG. 6). In the outboard flap 12, a plurality of fittings 12F (FIG. 2) that are respectively connected to the connection fittings 223, 224, and 225 are arranged along the aircraft axis direction D1.

The forward carriage 22F is fixed to the reciprocated moving body (not shown) of the screw driving unit 212. Each of the forward carriage 22F and the aft carriage 22A has a roller (not shown) that rolls on an inner side of the track rail 23.

The forward carriage 22F and the aft carriage 22A run with the respective rollers guided by the track rail 23 by the driving force transmitted from the screw driving unit 212 (FIG. 5).

The track rail 23 linearly extends diagonally downward from a forward end 23F up to an intermediate point before an aft end 23A, and is bent further downward at the intermediate point to reach the aft end 23A as shown in FIG. 5.

The track rail 23 is provided on an upper portion of a support body 231. The support body 231 is fixed to the lower surface of the main wing 11 at respective positions P1 and P2 shown in FIG. 5.

The fairing link 24 connects the fairing 20F, the carriage unit 22, and the track rail 23. With the carriage unit 22 running on the track rail 23, the fairing link 24 is displaced to move the fairing 20F.

The fairing link 24 is composed of three link members 241 to 243.

[Operation of the Flap by the Deployment Device]

When the outboard flap 12 is at the storage position shown in FIG. 5, the electric motor 211 is rotated in a predetermined direction to rotate a screw of the screw driving unit 212. The moving body thereby moves backward with respect to the screw, and the carriage unit 22 fixed to the moving body runs backward while being guided by the track rail 23. Accordingly, the outboard flap 12 supported by the carriage unit 22 is also carried backward along the track rail 23. The link member 243 of the fairing link 24 connected to the aft carriage 22A is also pushed out backward, so that the respective link members 241 to 243 are displaced counterclockwise in FIG. 5.

When the carriage unit 22 reaches the aft end 23A of the track rail 23, almost the entire outboard flap 12 is pulled out to the deployment position shown in FIG. 6, and a predetermined angle of attack corresponding to a shape of the track rail 23 is given. At this time, the fairing 20F is also moved to a position shown in FIG. 6.

An airflow F flowing from the lower surface side of the main wing 11 onto the upper surface side of the flap 12 when the outboard flap 12 is deployed is indicated by an alternate long and short dashed arrow in FIG. 6. The airflow F flowing along the lower surface of the main wing 11 is throttled between a forward end of the outboard flap 12 and the storage portion 16 of the main wing 11 to flow onto the upper surface side of the outboard flap 12 at high speed. Since the airflow F flows onto the upper surface side at high speed, and since the angle of attack is given, there is a large difference in flow velocity between the upper surface side and the lower surface side of the outboard flap 12, so that a large pressure difference corresponding to the flow velocity difference between the upper side and the lower side of the outboard flap 12 is obtained. Because of the pressure difference, high lift can be generated. Since a gap G between the forward end of the outboard flap 12 and the storage portion 16 of the main wing 11 is formed in such a shape as to guide the airflow F along the upper surface of the outboard flap 12, separation from the surface of the outboard flap 12 is suppressed by the airflow F flowing along the upper surface of the outboard flap 12, which also contributes to generate high lift by ensuring a large pressure difference between the upper and lower sides.

When the deployed outboard flap 12 is stored, the electric motor 211 is rotated in a direction opposite to that of the deployment, so that the carriage unit 22 runs forward. The outboard flap 12 is thereby carried forward to be stored in the storage portion 16 of the main wing 11. The fairing link 24 connected to the carriage unit 22 is also displaced to restore the fairing 20F to an original position (FIG. 5).

[Configuration Related to the Flap End Surface]

The present embodiment has a main feature in a direction of the end surface 31S of the outboard flap 12, and a direction of the inner wall 161 of the storage portion 16 facing the end surface 31S. In the following, the feature is described.

Figure 7A:
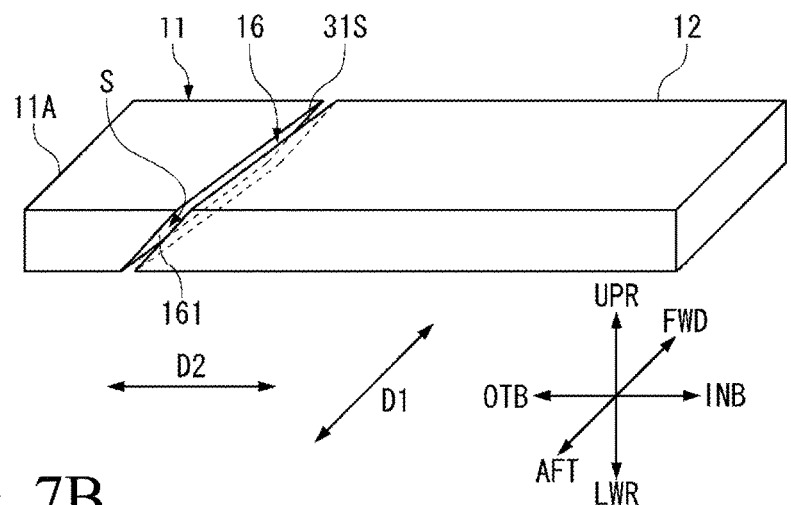
FIG. 7A is a perspective view schematically illustrating an end surface on the outboard side of the outboard flap and the storage portion.
Figure 7B:
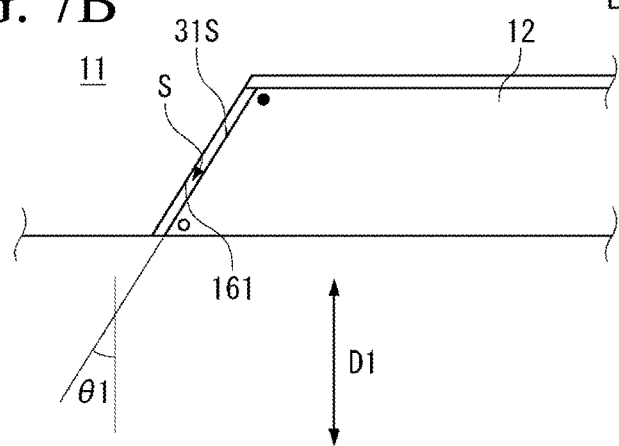
FIG. 7B is a plan view thereof.
Figure 7C:
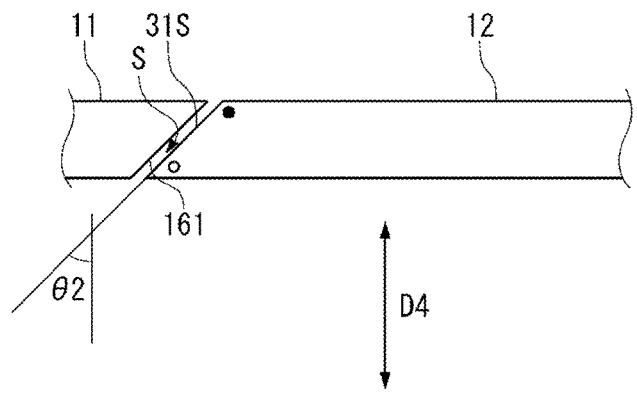
FIG. 7C is a side view thereof.

As shown in FIGS. 7A to 7C, the end surface 31S of the outboard flap 12 formed by the end rib 31 on the outboard side is inclined with respect to the aircraft axis direction D1 (FIG. 7B), and is also inclined with respect to a thickness direction D4 (also see FIG. 5) of the outboard flap 12 in the non-deployment (FIG. 7C). The thickness direction D4 corresponds to a direction connecting the upper surface side and the lower surface side of the main wing 11.

More specifically, the end surface 31S is inclined with respect to the aircraft axis direction D1 such that a position on the aft side of the aircraft axis direction D1 (indicated by a white circle) is located on the outboard side with respect to a position on the forward side of the aircraft axis direction D1 (indicated by a black circle) as shown in FIG. 7B.

Also, as shown in FIG. 7C, the end surface 31S is inclined with respect to the thickness direction D4 such that a position on the lower side of the thickness direction D4 (indicated by a white circle) is located on the outboard side with respect to a position on the upper side of the thickness direction D4 (indicated by a black circle).

When an inclination angle $\theta 1$ (FIG. 7B) of the end surface 31S with respect to the aircraft axis direction D1 and an inclination angle $\theta 2$ (FIG. 7C) of the end surface 31S with respect to the thickness direction D4 are compared, the angle $\theta 2$ is larger than the angle $\theta 1$.

The inner wall 161 of the storage portion 16 facing the end surface 31S is also inclined with respect to both of the aircraft axis direction D1 and the thickness direction D4 in accordance with the direction of the end surface 31S. The clearance S is formed with small dimensions between the inner wall 161 and the end surface 31S. The clearance S is formed to have constant or almost constant dimensions over the entire end surface 31S.

Figure 8:
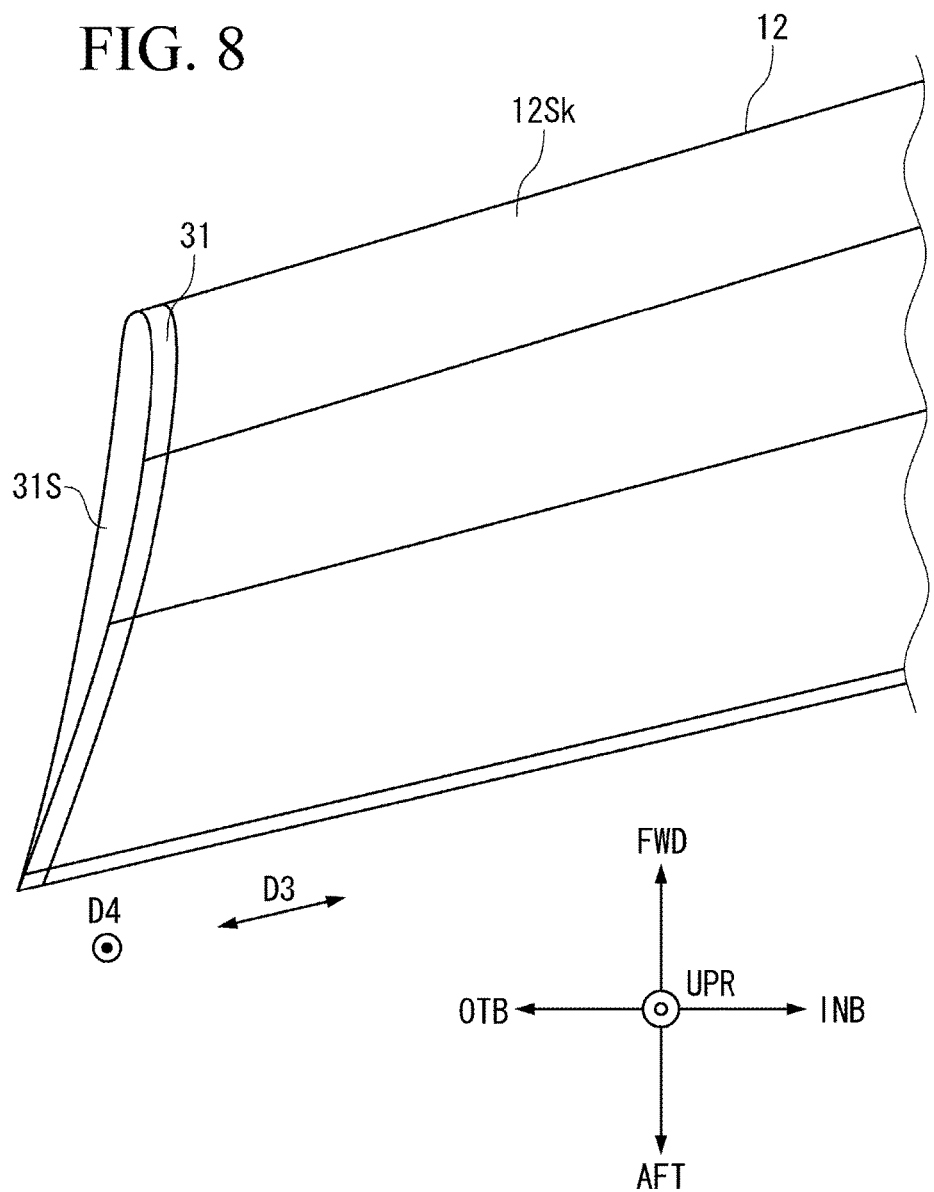
FIG. 8 is a plan view of the outboard flap.

FIG. 8 is a view of the outboard flap 12 as viewed down from above. That the end surface 31S is visible in FIG. 8 means that the end surface 31S of the outboard flap 12 is also inclined with respect to the thickness direction D4. As shown in FIG. 8, no member projecting from the end surface 31S is arranged on the end surface 31S. The end surface 31S is formed to be flat.

Figure 9A:
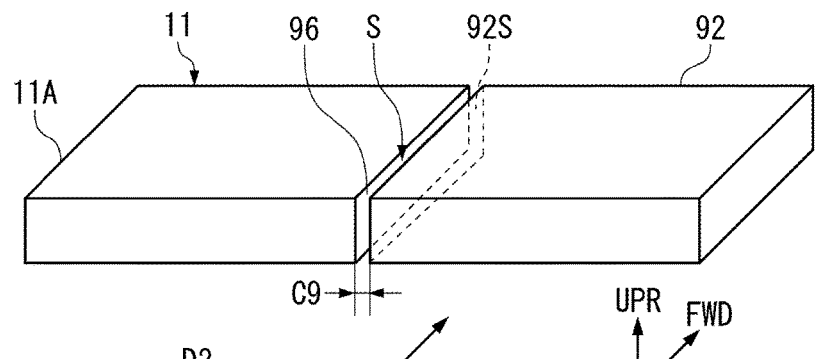
Figure 9B:
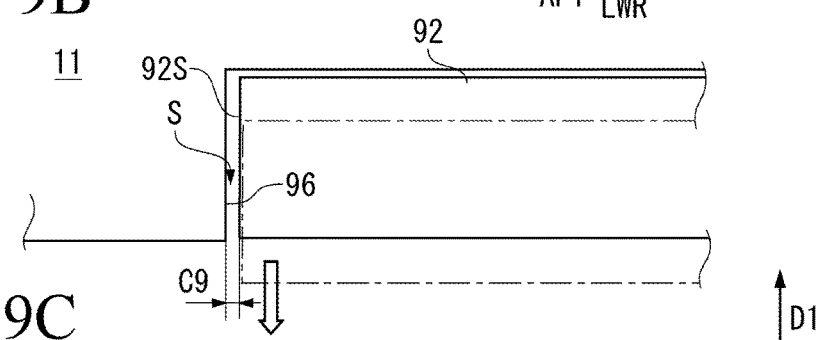
Figure 9C:
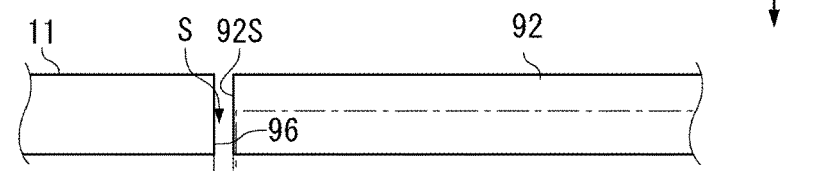

By the way, an end surface 92S of a conventional flap 92 is perpendicular to the span direction D2 as shown in FIG. 9A. In other words, the end surface 92S is formed parallel to the aircraft axis direction D1, and parallel to the thickness direction D4. An inner wall 96 is formed parallel to the aircraft axis direction D1 as shown in FIG. 9B. The inner wall 96 is formed parallel to the thickness direction D4 as shown in FIG. 9C.

Figure 9D:
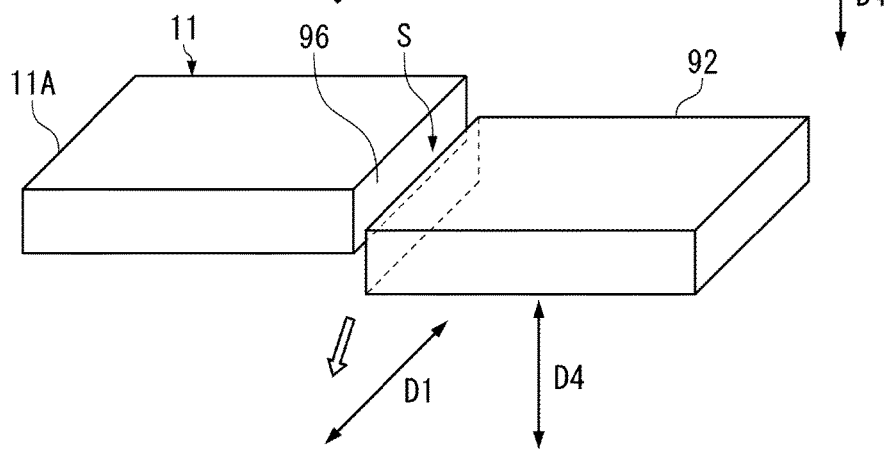

In deployment, the flap 92 moves backward in the aircraft axis direction D1 and downward in the thickness direction D4 with respect to the inner wall 96 as shown in FIG. 9D (see an outlined arrow). The moved flap 92 is indicated by an alternate long and short dash line in FIGS. 9B and 9C. As is understood from FIGS. 9B and 9C, dimensions C9 of a clearance S between the end surface 92S and the inner wall 96 remain constant while the flap 92 is being moved.

On the other hand, in the present embodiment (FIG. 7A), the end surface 31S is relatively displaced with respect to the inner wall 161 of the storage portion 16 when the flap 12 is deployed as shown in FIGS. 10A and 10B. Here, when the end surface 31S and the inner wall 161 are inclined with respect to both of the aircraft axis direction D1 and the thickness direction D4, the clearance S is gradually widened with the end surface 31S withdrawn from the inner wall 161 in association with the displacement of the flap 12 in the deployment (FIGS. 10A and 10B). Dimensions C2 and C2' of the clearance S of the flap 12 during movement are larger than dimensions C1 and C1' of the clearance S when the flap 12 is stored.

If the end surface 31S is perpendicular to the span direction D2 and the inner wall 161 is formed in accordance with the end surface 31S as shown in FIG. 10C (similar to FIG. 9C), the clearance S between the end surface 31S and the inner wall 161 is set parallel to a direction in which the flap 12 is displaced. In this case, while the flap 12 is being displaced, the dimensions of the clearance S remain constant. Here, if the dimensions of the clearance S are not sufficient for assembly tolerance or vibration displacement during a flight, the end surface 31S and the inner wall 161 possibly interfere with each other.

[Effects by the Present Embodiment]

In the present embodiment, even when the dimensions C1 and C1' of the clearance S when the flap 12 is stored are not excessively increased for the assembly tolerance or the vibration displacement of the outboard flap 12 and the main wing 11, the clearance S having larger dimensions than the dimensions C1 and C1' in the storage is ensured between the end surface 31S of the outboard flap 12 and the inner wall 161 of the storage portion 16 when the flap 12 performs a deployment operation. The wide clearance S absorbs the assembly tolerance or the vibration displacement, so that operational reliability of the flap can be improved by preventing interference between the end surface 31S and the inner wall 161 during a moving process of the flap 12. When the flap 12 largely projects from the trailing edge 11A of the main wing 11 in association with the deployment operation, the flap 12 is easily displaced due to air resistance or lift. However, as the flap 12 more largely projects, the clearance S is widened. Thus, the interference between the end surface 31S and the inner wall 161 by the displacement of the flap 12 at this time can be prevented.

When the flap 12 is stored in the storage portion 16, the clearance S is gradually narrowed. Before the flap 12 reaches the storage position, the dimensions of the clearance S are larger than the dimensions C1 and C1' in the storage. Thus, even during a process of a storage operation of the flap 12, the interference between the end surface 31S and the inner wall 161 can be prevented.

In the present embodiment, the clearance S between the end surface 31S and the inner wall 161 can be set to be as small as possible without considering a margin for avoiding the interference between the outboard flap 12 and the inner wall 161. By decreasing the clearance S, air resistance can be suppressed, and noise due to the air resistance can be reduced. It is also possible to ensure a wide area for a control surface of the outboard flap 12.

In the present embodiment, the inclination angle θ2 of the end surface 31S of the flap 12 and the inner wall 161 of the main wing 11 with respect to the thickness direction D4 is larger than the inclination angle θ1 of the end surface 31S and the inner wall 161 with respect to the aircraft axis direction D1 as shown in FIGS. 7B and 7C. Accordingly, the wide clearance is ensured between the end surface 31S and the inner wall 161 over an entire track 39 (FIG. 6) of the flap 12 defined by the track rail 23 (FIG. 6), and the interference therebetween can be surely prevented.

That is, even when a displacement amount in the thickness direction D4 is smaller than a displacement amount in the aircraft axis direction D1 in a region 39A at an initial stage of the deployment in the track 39, the clearance S (FIG. 10B) between the end surface 31S and the inner wall 161 is widened with regard to the thickness direction D4 as well since the angle θ2 is larger. Thus, the interference between the end surface 31S and the inner wall 161 can be avoided by ensuring the wide clearance S therebetween.

Figure 21A:
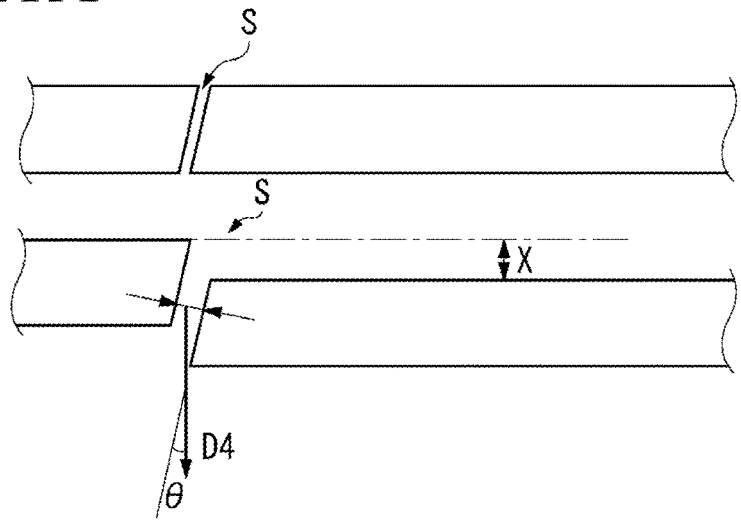
FIGS. 21A-21C are views for explaining an inclination angle of an end surface of a flight control surface and a portion of a main wing of the present invention.
Figure 21B:
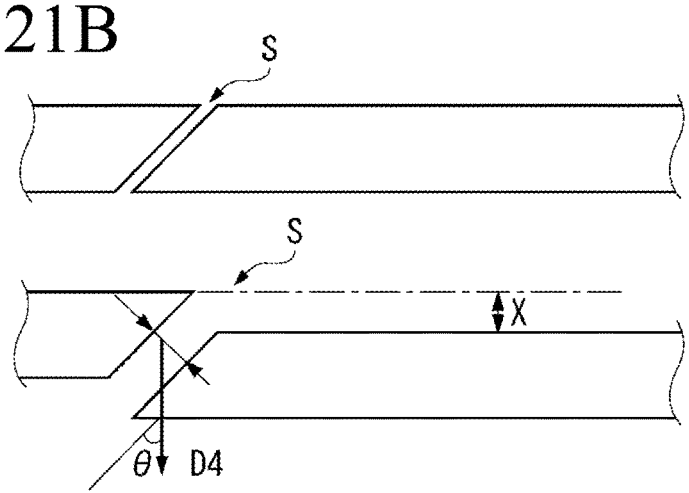
Figure 21C:
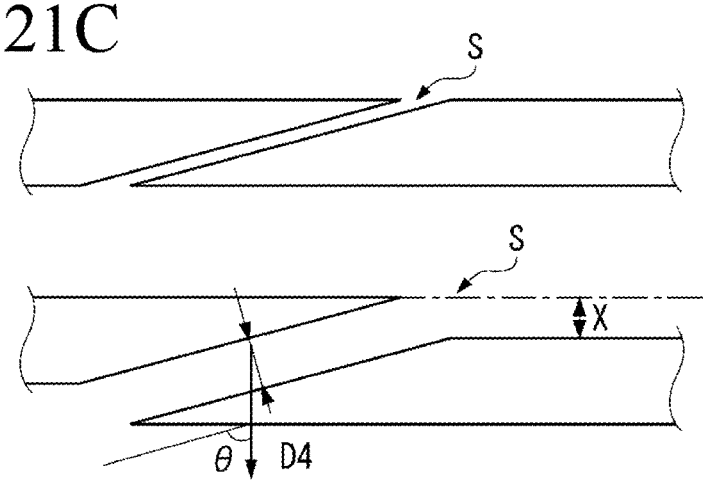

As shown in FIGS. 21A-21C, an inclination angle θ is increased in the order of FIGS. 21A, 21B, and 21C, and as a direction of a clearance S between an end surface of a flight control surface and a portion of a main wing becomes closer to the thickness direction D4, the clearance S becomes wider with respect to the same displacement amount X in the thickness direction D4.

From the above viewpoint, it is effective to set the inclination angle θ2 with respect to the thickness direction D4 to be large as shown in FIG. 21C (FIG. 17C as well) according to a shape of the track 39.

Furthermore, since no member projecting from the end surface 31S is arranged on the end surface 31S of the outboard flap 12 of the present embodiment (FIG. 8), air resistance on the end surface 31S can be suppressed when the outboard flap 12 is deployed. That is, since no member disturbing an airflow is arranged on the end surface 31S, the air resistance can be suppressed, and noise due to the air resistance can be reduced. Particularly, during landing in which power of the engine 17 is reduced, a ratio of noise generated by the flap 12 to total noise generated by the aircraft 10 is increased. Thus, a larger effect is produced by reducing the noise.

Examples of the member projecting from the end surface 31S include a guide member (corresponding to the above guide rib 35R (FIG. 4B)) that guides the outboard flap 12 into the correct storage position to accommodate the outboard flap 12 in the storage portion 16 even when the outboard flap 12 is displaced in association with deformation of the main wing 11 during a flight.

In order to achieve the configuration in which no aerodynamically superfluous member such as the guide member is arranged on the end surface 31S, positions of providing the deployment devices 20 and 20 that support the outboard flap 12 are determined in the present embodiment. The outboard flap 12 of the present embodiment does not need to be guided by the guide member even when the outboard flap 12 is displaced in association with the deformation of the main wing 11 during a flight, and is moved to the correct storage position only by operating the deployment devices 20.

Although the main wing 11 of the above first embodiment includes the two flaps 12 and 13, the main wing 11 may include only one flap, or three or more flaps depending on a length, a form, or the like of the main wing 11.

Modification of the First Embodiment

Figure 11A:
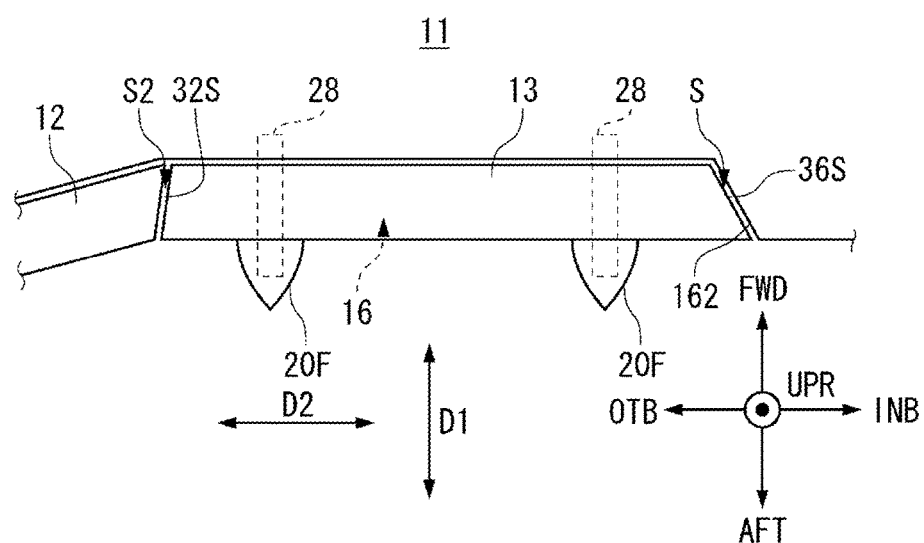
FIG. 11A is a plan view of a main wing according to a modification of the first embodiment and FIG. 11B is a side view illustrating an inboard flap of the main wing in FIG. 11A and a storage portion of the main wing.
Figure 11B:
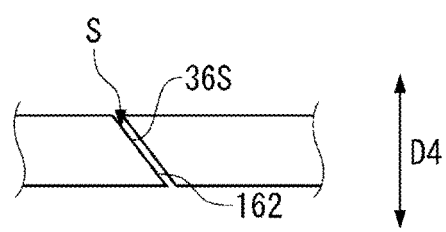

As shown in FIG. 11A, the inboard side of the inboard flap 13 may be supported by the deployment device 28 provided in the main wing 11. In this case, an inner wall 162 facing the end surface 36S on the inboard side of the inboard flap 13 is formed in the storage portion 16 of the main wing 11. When the end surface 36S of the inboard flap 13 is formed so as to be inclined with respect to the aircraft axis direction D1 and the thickness direction D4 as shown in FIGS. 11A and 11B, a wide clearance S is ensured between the end surface 36S and the inner wall 162 when the inboard flap 13 is deployed and stored. Thus, operational reliability of the flap can be improved by preventing interference between the end surface 36S and the inner wall 162.

Second Embodiment

Next, a second embodiment of the present invention will be described by reference to FIGS. 1 and 12 to 15.

The second embodiment relates to the slat 15 (FIG. 1) provided on the main wing 11 at the leading edge 11F. While the slat 15 differs in a deployed direction from the flaps 12 and 13 of the first embodiment, the slat 15 is a flight control surface that is moved from the main wing between a projecting position and a retracted position, and generates high lift during takeoff and landing or the like similarly to the flaps 12 and 13. A direction of an end surface of the slat 15 can be determined by employing the same idea as that of the direction of the end surface of the outboard flap 12 in the first embodiment. A description is made below.

The plurality of (here, four) slats 15 are provided on the main wing 11. One of the slats 15 is arranged on the inboard side with respect to the engine pylon 18, and the other three slats 15 are arranged on the outboard side with respect to the engine pylon 18.

The plurality of slats 15 extend along directions inclined with respect to the span direction D2, respectively. The extending directions are referred to as longitudinal directions for the respective slats 15. Longitudinal directions D5 of the respective slats 15 arranged on the outboard side are the same as each other. A longitudinal direction D5' of the slat 15 arranged on the inboard side has a slightly larger inclination angle with respect to the span direction D2 than that of the longitudinal directions D5 of the slats 15 arranged on the outboard side.

When the aircraft 10 is cruising, the slat 15 is flush with the main wing 11, and constitutes a portion of the main wing 11 as shown in FIG. 12A. At this time, the slat 15 is retracted to a retraction position adjacent to a leading edge 110F of a main wing body 110 that is a body of the main wing 11. Note that the main wing body 110 and the slat 15 are shown apart from each other with intent to clearly distinguish the main wing body 110 and the slat 15 in FIG. 12A.

When the aircraft 10 is preparing to take off or land, the slat 15 is deployed to a deployment position apart from the leading edge 110F of the main wing body 110 as shown in FIG. 12B in order to generate high lift. At this time, the slat 15 is moved forward and downward from the main wing body 110, and a gap 150 is formed between the main wing body 110 and the slat 15.

An outer shell of the slat 15 is composed of a skin 45, a cove 46, and a lower surface plate 47.

The skin 45 is composed of an upper surface 45U and a lower surface 45L that smoothly continue from a leading edge 15F of the slat 15. The upper surface 45U is formed to extend longer than the lower surface 45L toward the main wing body 110. The lower surface plate 47 is formed integrally with the lower surface 45L.

The cove 46 is a recessed portion formed in a region of the slat 15 facing the leading edge 110F of the main wing body 110. The leading edge 110F of the main wing body 110 is stored in the cove 46 when the slat 15 is retracted (in non-deployment).

The lower surface plate 47 is a plate-like member extending toward the main wing body 110 from a ridge portion 48 where the lower surface 45L and the cove 46 intersect with each other. The lower surface plate 47 is integrally fixed to the skin 45 continuously to the lower surface 45L.

Figure 13:
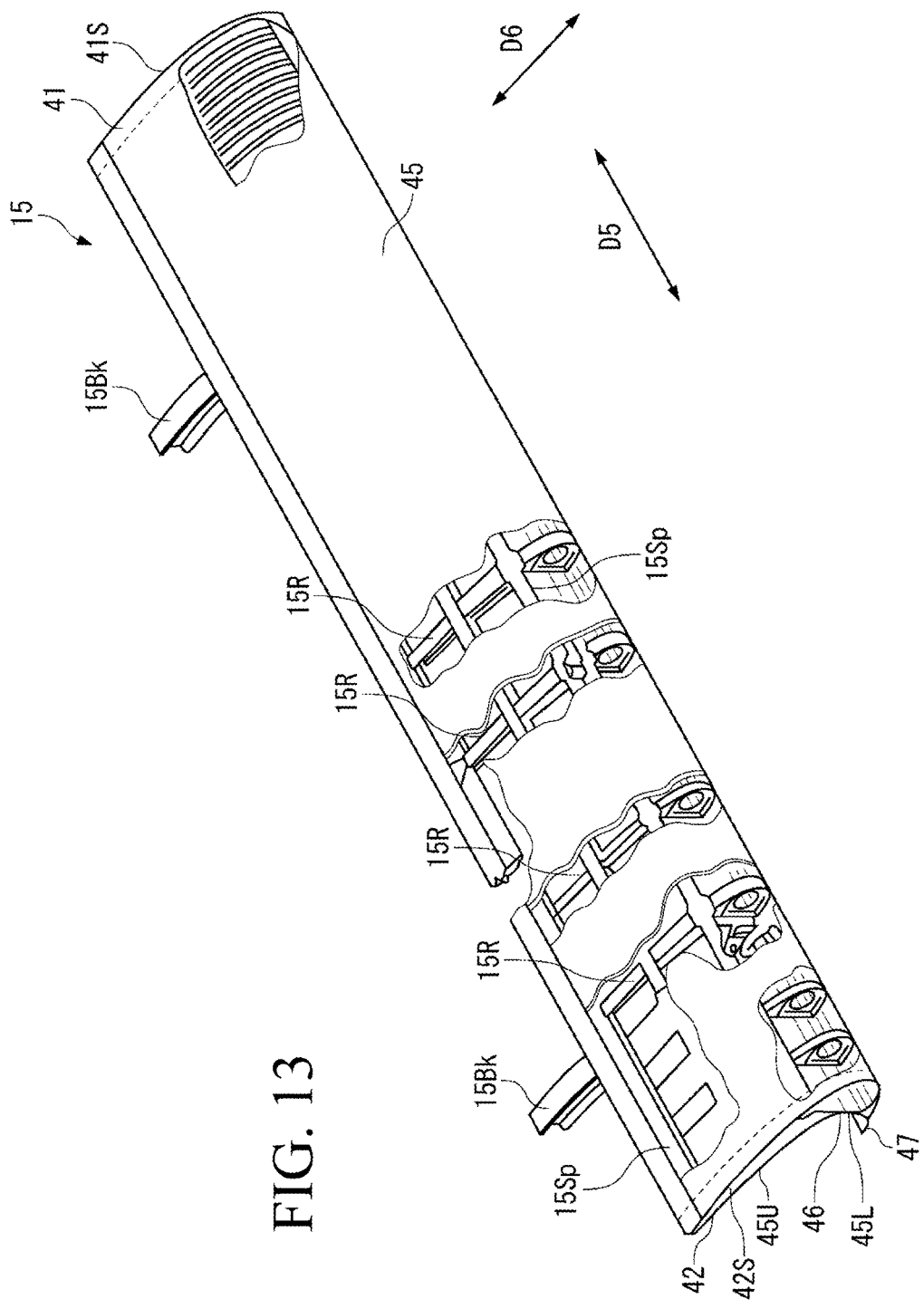
FIG. 13 is a perspective view of the slat according to the second embodiment.

FIG. 13 shows the slat 15 (15A) arranged on the most outboard side out of the plurality of slats 15. The slat 15 includes a plurality of ribs 15R that are arranged at intervals in the longitudinal direction D5 of the slat 15, and a spar 15Sp that extends in the longitudinal direction D5 to connect the plurality of ribs 15R as a frame member covered with the skin 45, and also includes a pair of rail brackets 15Bk that are attached to the main wing body 110. The rail brackets 15Bk are preferably provided close to both end portions of the slat 15. A rack (not shown) is provided on each of the rail brackets 15Bk. A pinion that meshes with the rack, and a motor that rotates the pinion are provided in the main wing body 110. By rotationally driving the pinion by the motor, the slat 15 is driven to reciprocate between the retraction position and the deployment position together with the rail bracket 15Bk.

The rail bracket 15Bk and the pinion guide the slat 15 forward and downward. The rail bracket 15Bk is arranged along a guide direction D6 perpendicular to the longitudinal direction D5.

A rib arranged on the most outboard side out of the plurality of ribs 15R of the slat 15 shown in FIG. 13 is referred to as an end rib 41, and a rib arranged on the most inboard side is referred to as an end rib 42.

The end rib 41 forms an end surface 41S on the outboard side of the slat 15. The end rib 42 forms an end surface 42S on the inboard side of the slat 15.

Figure 14A:
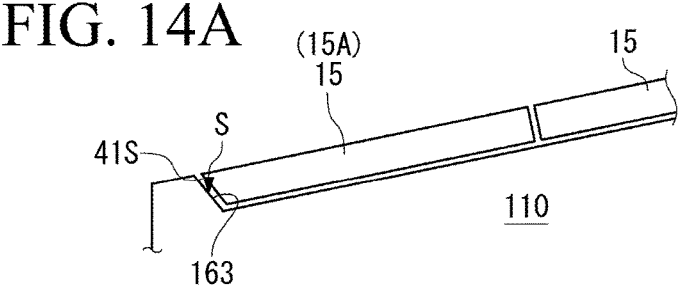
FIG. 14A is a plan view illustrating the slat.

The end rib 41 on the outboard side faces a wall 163 formed in the main wing body 110 as shown in FIG. 14A. A clearance S between the end rib 41 and the wall 163 is sealed by a rubber seal (not shown) fixed to the wall 163.

The end rib 42 on the inboard side faces an end rib of the slat 15 adjacent to the slat 15 shown in FIG. 13. A clearance between the end rib and the end rib 42 is sealed by a rubber seal (not shown).

The present embodiment has a main feature in a direction of the end surface 41S of the slat 15 (15A) arranged on the most outboard side, and a direction of the wall 163 of the main wing body 110 facing the end surface 41S. In the following, the feature is described.

Figure 14B:
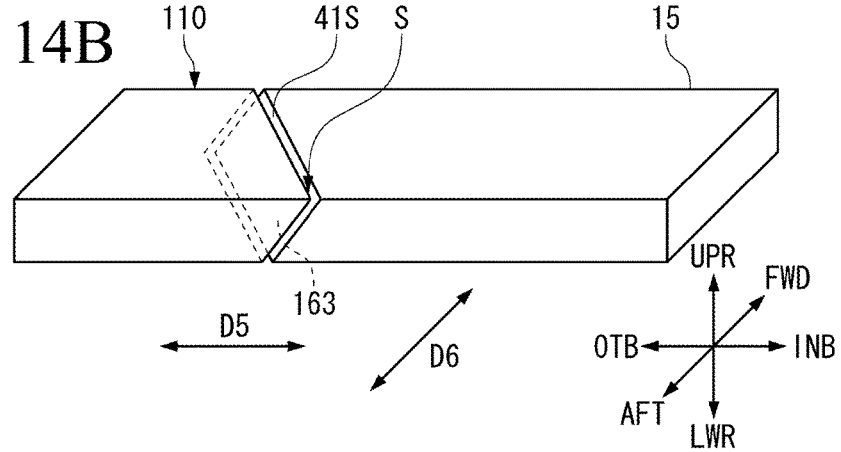
FIG. 14B is a perspective view schematically illustrating an end surface on the outboard side of the slat and a wall of a main wing body.
Figure 14C:
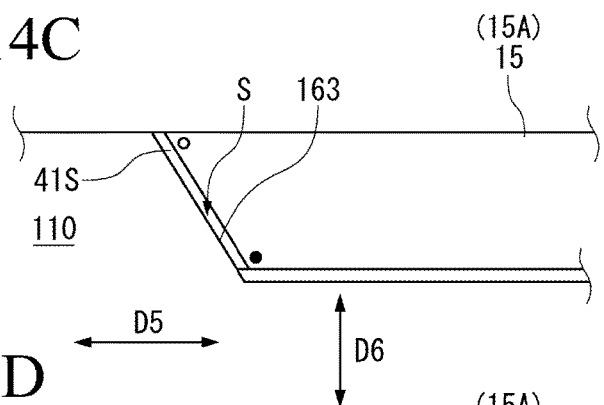
FIG. 14C is a plan view thereof.
Figure 14D:
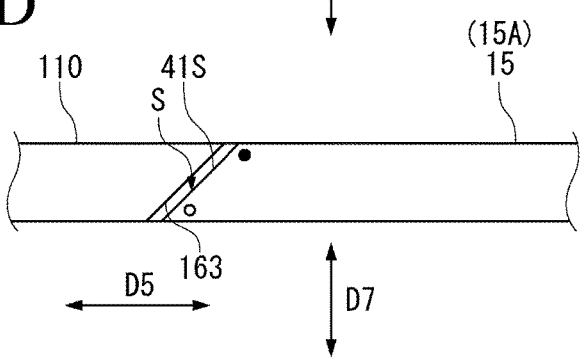
FIG. 14D is a side view thereof.

The end surface 41S of the slat 15 formed by the end rib 41 of the slat 15 is inclined with respect to the guide direction D6 (FIG. 14C), and is also inclined with respect to a thickness direction D7 of the slat 15 in the non-deployment (FIG. 14D) as shown in FIGS. 14B to 14D. The thickness direction D7 corresponds to the direction connecting the upper surface side and the lower surface side of the main wing 11.

More specifically, the end surface 41S is inclined with respect to the guide direction D6 such that a position on the forward side of the guide direction D6 (indicated by a white circle) is located on the outboard side with respect to a position on the aft side of the guide direction D6 (indicated by a black circle) as shown in FIG. 14C.

Also, the end surface 41S is inclined with respect to the thickness direction D7 such that a position on the lower side of the thickness direction D7 (indicated by a white circle) is located on the outboard side with respect to a position on the upper side of the thickness direction D7 (indicated by a black circle) as shown in FIG. 14D.

The wall 163 of the main wing body 110 facing the end surface 41S is also inclined with respect to both of the guide direction D6 and the thickness direction D7 in accordance with the direction of the end surface 41S. The clearance S is formed with small dimensions between the wall 163 and the end surface 41S. The clearance S is formed to have constant or almost constant dimensions over the entire end surface 41S.

In the present embodiment, the guide direction D6 corresponding to the direction of the rail bracket 15Bk is used as a reference of the direction of the end surface 41S unlike in the first embodiment in which the aircraft axis direction D1 is used as a reference of the direction of the end surface 31S. Both of the aircraft axis direction D1 and the guide direction D6 have a common point that the directions connect the nose side and the tail side.

Figure 15A:
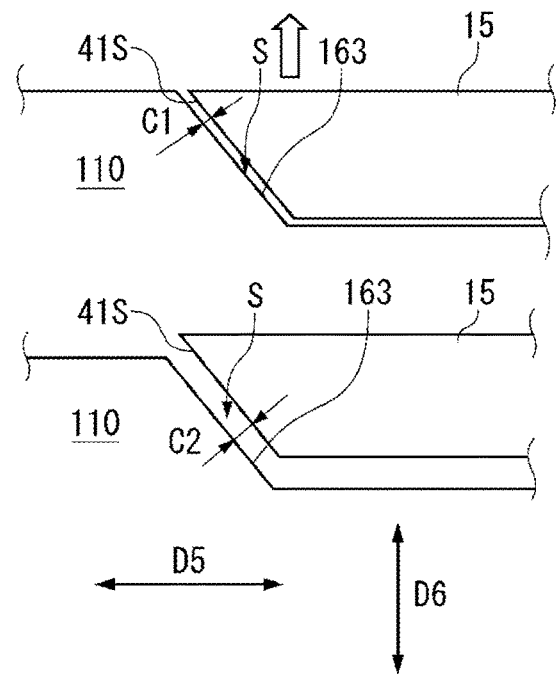
Figure 15B:
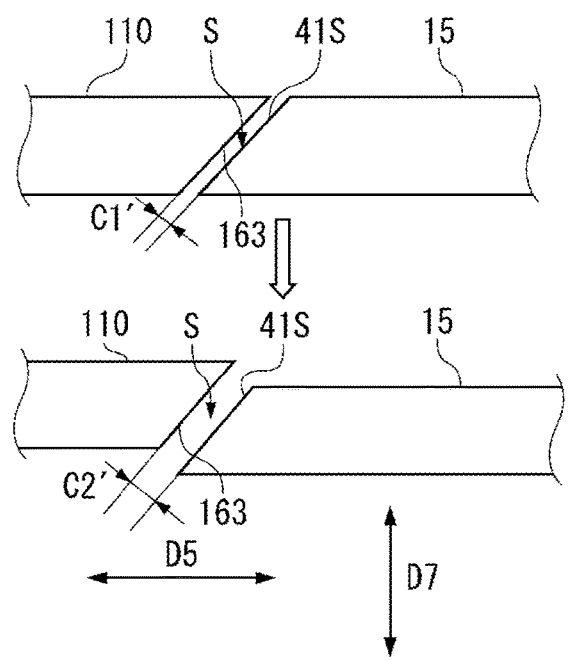

In the present embodiment, the end surface 41S of the slat 15 is relatively displaced with respect to the wall 163 of the main wing body 110 when the slat 15 is deployed as shown in FIGS. 15A and 15B. Here, when the end surface 41S and the wall 163 are inclined with respect to both of the guide direction D6 and the thickness direction D7, the clearance S is gradually widened in association with the displacement of the slat 15 in the deployment. Dimensions C2 and C2' of the clearance S of the slat 15 during movement are larger than dimensions C1 and C1' of the clearance S when the slat 15 is retracted.

Therefore, even when the dimensions C1 and C1' of the clearance S when the slat 15 is stored are not excessively increased for assembly tolerance or vibration displacement during a flight of the slat 15 and the main wing body 110, the clearance S having larger dimensions than the dimensions C1 and C1' in the storing is ensured when the slat 15 performs a deployment operation. The wide clearance S absorbs the assembly tolerance or the vibration displacement, so that operational reliability of the slat can be improved by preventing interference between the end surface 41S and the wall 163 of the main wing body 110 during a moving process of the slat 15. When the slat 15 largely projects from the leading edge 110F of the main wing body 110 in association with the deployment operation, the slat 15 is easily displaced due to air resistance or lift. However, as the slat 15 more largely projects, the clearance S is widened. Thus, the interference between the end surface 41S and the wall 163 by the displacement of the slat 15 at this time can be prevented.

When the slat 15 is retracted, the clearance S is gradually narrowed. Before the slat 15 reaches the retraction position, the dimensions of the clearance S are larger than the dimensions C1 and C1' in the retraction. Thus, even during a process of storing the slat 15, the interference between the end surface 41S and the wall 163 can be prevented.

In the present embodiment, the clearance S between the end surface 41S and the wall 163 can be set to be as small as possible without considering a margin for avoiding the interference between the slat 15 and the main wing body 110. By decreasing the clearance S, air resistance can be suppressed, and noise due to the air resistance can be reduced. It is also possible to ensure a wide area for a control surface of the slat 15.

In the present embodiment, at least one of an end surface on the inboard side and an end surface on the outboard side of a slat 15B (FIG. 1) arranged on the most inboard side may be inclined with respect to two directions. To be more specific, the end surface may be formed so as to be inclined with respect to both of a guide direction perpendicular to the longitudinal direction D5' and a thickness direction of the slat 15B.

Figure 16A:
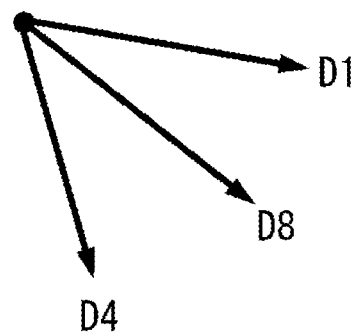
FIGS. 16A-16C are schematic views for explaining a direction in which a flight control surface of the present invention is deployed, and a direction of inclination of an end surface of the flight control surface.
Figure 16B:
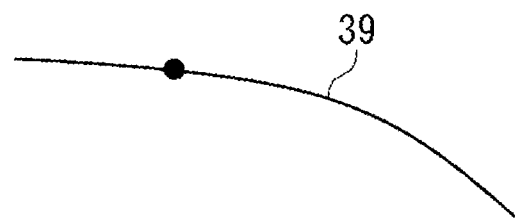
Figure 16C:
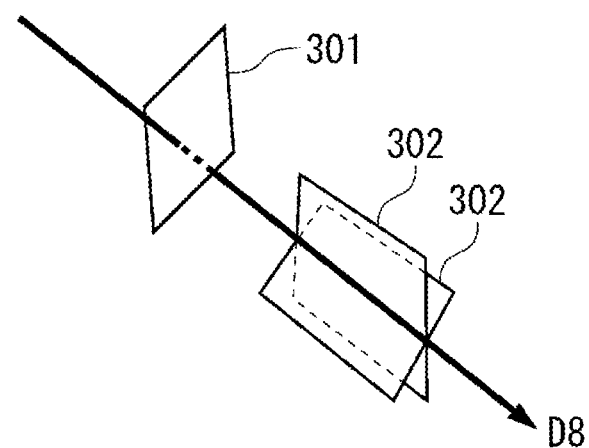

By reference to FIGS. 16A-16C, a description is added regarding an inclination direction of the end surface of the flight control surface of the present invention.

FIG. 16A shows a first direction D1, a second direction D4, and a direction D8 obtained by synthesizing the first direction D1 and the second direction D4. In a case in which a direction of the flight control surface is changed with respect to a displacement amount of the flight control surface in a track of the flight control surface, the direction D8 is obtained by synthesizing the first direction D1 and the second direction D4 at any point on a track 39 (FIG. 16B).

Here, in FIG. 16C, an end surface 301 of the flight control surface and a portion (not shown) of the main wing facing the end surface 301 intersect with the direction D8. If the end surface 301 and the facing portion of the main wing are parallel to the direction D8 like surfaces 302, dimensions of a clearance between the flight control surface and the facing portion of the main wing are not changed when the flight control surface is displaced with respect to the facing portion of the main wing. Since the end surface 301 and the facing portion of the main wing intersect with the direction D8, the dimensions of the clearance between the flight control surface and the facing portion of the main wing gradually become larger when the flight control surface is displaced in deployment. Accordingly, reliability can be improved by preventing interference as described in the above respective embodiments.

The flight control surface and the facing portion of the main wing in the present invention are not limited to a configuration in which the end surface is inclined with respect to the two directions that are deployment directions as in the flap of the first embodiment and the slat of the second embodiment, and the end surface only needs to be inclined with respect to at least one of the first direction and the second direction. That is, configurations shown in the following table are included in the present invention.

TABLE 1

| | | End surface of flight control surface | Facing portion of main wing |
|---|---|---|---|
| (1) | Aircraft axis direction D1 | Inclined | Inclined |
| | Thickness direction D4 | Inclined | Inclined |
| (2) | Aircraft axis direction D1 | Inclined | Inclined |
| | Thickness direction D4 | Parallel | Parallel |
| (3) | Aircraft axis direction D1 | Parallel | Parallel |
| | Thickness direction D4 | Inclined | Inclined |

Figure 17A:
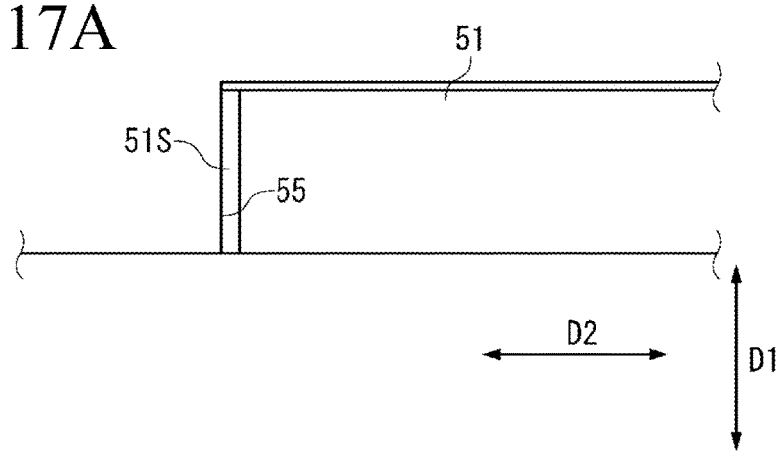
FIGS. 17A-17C are views illustrating a flight control surface, an end surface of which is inclined only with respect to a thickness direction.
Figure 17B:
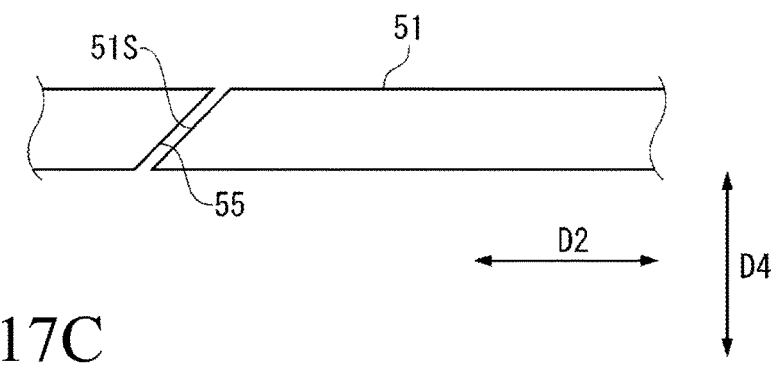

In the above table, (1) corresponds to the first embodiment (FIGS. 7A-7C and 10A-10C) and the second embodiment (FIGS. 14A-14D and 15A,15B), and (3) corresponds to a configuration shown in FIGS. 17A,17B.

While an end surface 51S of a flight control surface 51 shown in FIGS. 17A and 17B is formed parallel to the aircraft axis direction D1 (the first direction) (FIG. 17A), the end surface 51S is inclined with respect to the thickness direction D4 (the second direction) (FIG. 17B). Since the end surface 51S intersects with the direction D8 obtained by synthesizing the first direction D1 and the second direction D4 as described above, a clearance between the end surface 51S and a facing portion 55 of the main wing is gradually widened when the flight control surface 51 is deployed. Accordingly, interference can be prevented.

However, the end surface of the flight control surface is more preferably inclined with respect to both of the first direction and the second direction as in the first and second embodiments because the wider clearance (C2, C2' in FIGS. 10A,10B) can be ensured between the end surface of the flight control surface and the portion of the main wing with respect to the same moving distance of the flight control surface in the deployment as compared to the case in which the end surface of the flight control surface is inclined with respect to only one of the directions as shown in FIGS. 17A and 17B.

Figure 17C:
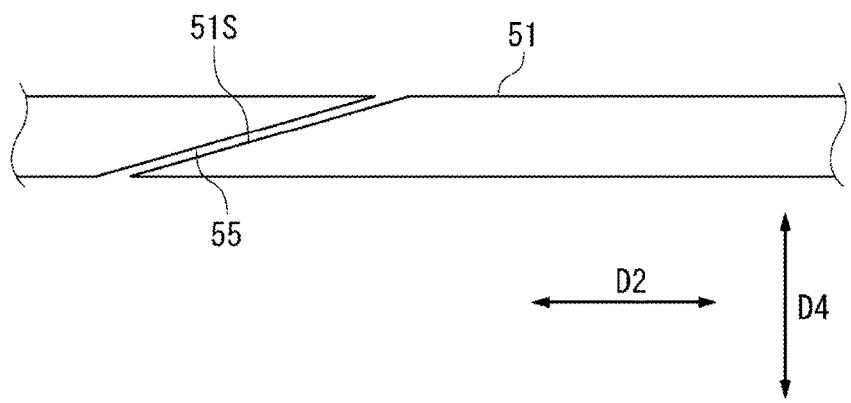

As long as the end surface of the flight control surface intersects with the direction D8, the end surface may have any inclination angle. For example, as shown in FIG. 17C, the inclination angle of the end surface 51S with respect to the thickness direction D4 can be set to be large.

Next, a modification of the present invention will be described by reference to FIGS. 18A-18C.

Figure 18A:
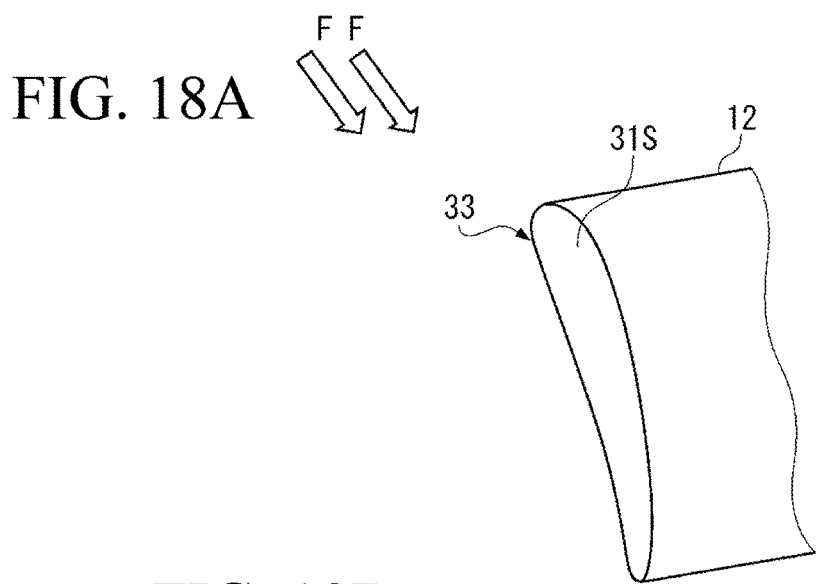

FIG. 18A shows a state in which the outboard flap 12 is placed in an airflow FF during a flight. Since the outboard flap 12 is integrated with the main wing 11 when stored (see FIG. 1), a wingtip of the outboard flap 12 is not exposed. When the outboard flap 12 is deployed, the end surface 31S of the outboard flap 12 constitutes a wingtip 33.

Figure 18B:
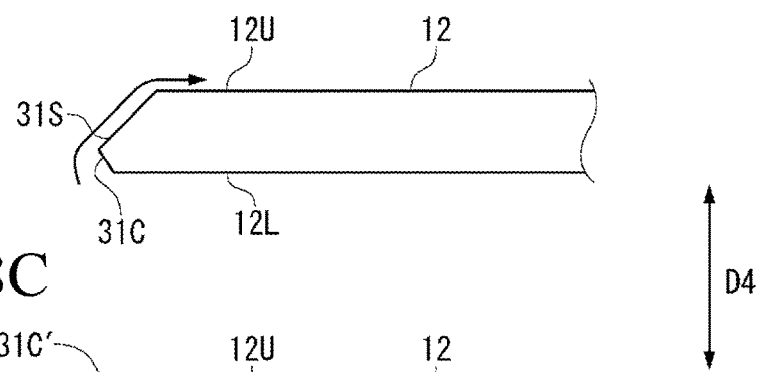

As shown in FIG. 18B, at the wingtip 33, the end surface 31S inclined with respect to the thickness direction D4 is interposed between an upper surface 12U and a lower surface 12L of the outboard flap 12, and a chamfered portion 31C is interposed between the end surface 31S and the lower surface 12L. The chamfered portion 31C is located in a connecting portion between the end surface 31S and the lower surface 12L.

By employing the above configuration, an airflow directed to the upper surface 12U-side from the lower surface 12L-side of the outboard flap 12 via the end surface 31S based on a pressure difference between the upper surface 12U-side and the lower surface 12L-side can be guided in a direction along the upper surface 12U as indicated by an arrow. Fluid energy is thereby supplied to a boundary layer between the upper surface 12U and the airflow, and separation of the boundary layer can be suppressed. Thus, a large pressure difference can be ensured between the upper side and the lower side of the outboard flap 12 based on a flow on the upper surface 12U-side and a flow on the lower surface 12L-side, and high lift can be surely generated.

The chamfered portion 31C is more preferably formed in a curved shape (FIG. 18C) because the airflow smoothly passes therethrough.

Figure 18C:
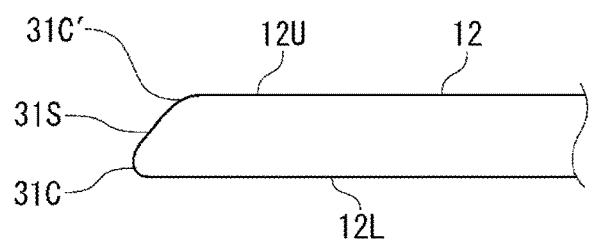

As shown in FIG. 18C, it is more preferable to further form a linear or curved chamfered portion 31C' in a connecting portion between the upper surface 12U and the end surface 31S of the outboard flap 12.

In the present invention, the end surface of the flight control surface and the portion facing the end surface do not always need to be entirely inclined with respect to a reference direction in which the flight control surface is deployed.

Figure 19A:
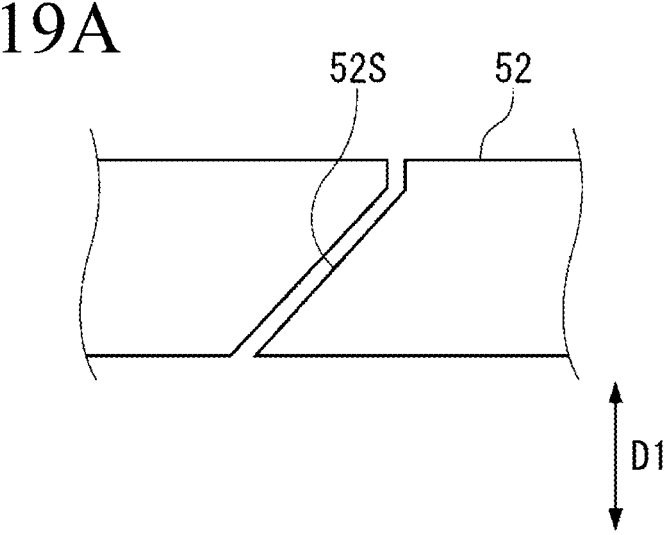
FIGS. 19A and 19B are views illustrating a modification of the present invention.
Figure 19B:
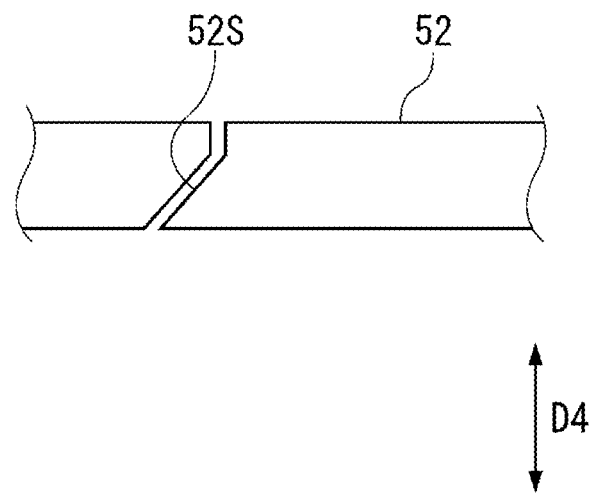

For example, interference with the facing portion of the main wing is difficult to occur on a base side (a support portion side) of the flight control surface due to small vibration displacement. In this case, the base side of an end surface 52S of a flight control surface 52 is allowed to be formed parallel to the first direction D1 and the second direction D4 as shown in FIGS. 19A and 19B.

Therefore, the present invention also includes a configuration in which at least only one region of the end surface of the flight control surface is inclined with respect to the reference direction.

FIGS. 20A-20D show a flight control surface (here, a flap 82) according to another embodiment of the present invention.

An end surface 82S of the flap 82 shown in FIG. 20A is perpendicular to the span direction D2. In other words, the end surface 82S is formed parallel to the aircraft axis direction D1 and parallel to the thickness direction D4.

On the other hand, as shown in FIG. 20B, an inner wall 86 of the storage portion of the main wing is inclined with respect to the aircraft axis direction D1. The inner wall 86 is formed so as to be gradually separated from the end surface 82S from the forward side toward the aft side. The inner wall 86 is formed parallel to the thickness direction D4 as shown in FIG. 20C. FIG. 20C shows a clearance S between the inner wall 86 and the end surface 82S from an aft end side of the flap 82.

In deployment, the flap 82 moves backward in the aircraft axis direction D1 and downward in the thickness direction D4 with respect to the inner wall 86 as shown in FIG. 20D (see an outlined arrow). The moved flap 82 is indicated by an alternate long and short dash line in FIGS. 20B and 20C.

Both the end surface 82S of the flap 82 and the inner wall 86 of the main wing are parallel to the thickness direction D4. Therefore, with regard to the thickness direction D4, a dimension C1' of the clearance S between the end surface 82S and the inner wall 86 remains constant even when the end surface 82S and the inner wall 86 are relatively displaced by the movement of the flap 82 as shown in FIG. 20C.

On the other hand, only the inner wall 86 of the main wing out of the end surface 82S of the flap 82 and the inner wall 86 is inclined with respect to the aircraft axis direction D1. Therefore, the clearance S between the end surface 82S and the inner wall 86 is gradually widened when the end surface 82S and the inner wall 86 are relatively displaced by the movement of the flap 82 as shown in FIG. 20B. A dimension C2 of the clearance S of the flap 82 during the movement is larger than a dimension C1 of the clearance S at a forward end of the flap 82 when the flap 82 is stored.

Based on the above description, even when only the inner wall 86 of the main wing out of the end surface 82S of the flap 82 and the inner wall 86 is inclined with respect to the aircraft axis direction D1, the clearance S between the end surface 82S and the inner wall 86 is widened similarly to the first embodiment. Thus, effects similar to those of the first embodiment can be obtained.

In the example shown in FIGS. 20A-20D, only the inner wall 86 out of the end surface 82S and the inner wall 86 is inclined with respect to the aircraft axis direction D1. However, even when only the end surface 82S is inclined with respect to the aircraft axis direction D1, the clearance S is widened in the deployment similarly to the above description. Also, even when the inner wall 86 or the end surface 82S is inclined with respect to, not the aircraft axis direction D1, but the thickness direction D4, or is inclined with respect to both of the aircraft axis direction D1 and the thickness direction D4, the clearance S is widened in the deployment.

That is, configurations shown in the following table are included in the present invention. In the following table, (1) corresponds to the configuration shown in FIGS. 20A-20D.

TABLE 2

|     |                            | End surface of flight control surface | Facing portion of main wing |
| --- | -------------------------- | ------------------------------------- | --------------------------- |
| (1) | Aircraft axis direction D1 | Parallel                              | Inclined                    |
|     | Thickness direction D4     | Parallel                              | Parallel                    |
| (2) | Aircraft axis direction D1 | Inclined                              | Parallel                    |
|     | Thickness direction D4     | Parallel                              | Parallel                    |
| (3) | Aircraft axis direction D1 | Parallel                              | Parallel                    |
|     | Thickness direction D4     | Parallel                              | Inclined                    |

TABLE 2-continued

|   |   | End surface of flight control surface | Facing portion of main wing |
|---|---|---|---|
| (4) | Aircraft axis direction D1 | Parallel | Parallel |
|   | Thickness direction D4 | Inclined | Parallel |
| (5) | Aircraft axis direction D1 | Parallel | Inclined |
|   | Thickness direction D4 | Parallel | Inclined |
| (6) | Aircraft axis direction D1 | Inclined | Parallel |
|   | Thickness direction D4 | Inclined | Parallel |

The constitutions described in the aforementioned embodiments may be also freely selected or appropriately changed into other constitutions without departing from the scope of the present invention.

The direction in which the flight control surface is deployed in the present invention is not limited to the directions in the above respective embodiments.

For example, in the slat 15, a guide may be configured which determines a direction of deploying the slat 15 such that the slat 15 is deployed in a direction from the tail side to the nose side of, not the guide direction D6, but the aircraft axis direction D1 (the first direction), and in a direction from the upper surface side to the lower surface side of the main wing 11 of the thickness direction D4 (the second direction).

What is claimed is:

1. An aircraft comprising:
a main wing; and
a flight control surface that is deployed from the main wing in a first direction and in a second direction different from the first direction, the flight control surface having an end surface on at least one side of a longitudinal direction of the flight control surface, the end surface facing a portion of the main wing when the flight control surface is not deployed,
wherein the first direction is either a direction from a nose side to a tail side of the aircraft or a direction from the tail side to the nose side of the aircraft,
the second direction is a direction from an upper surface side to a lower surface side of the main wing,
the end surface of the flight control surface is inclined with respect to the second direction, and
the portion of the main wing is also inclined with respect to the second direction in accordance with the end surface.

2. The aircraft according to claim 1,
wherein the end surface of the flight control surface is inclined with respect to both of the first direction and the second direction, and
the portion of the main wing facing the end surface is also inclined with respect to both of the first direction and the second direction in accordance with the end surface.

3. The aircraft according to claim 2, wherein the flight control surface includes:
a lower surface, and
a connecting portion between the end surface and the lower surface, the connecting portion being chamfered.

4. The aircraft according to claim 1, wherein the flight control surface includes:
a lower surface, and
a connecting portion between the end surface and the lower surface, the connecting portion being chamfered.

5. The aircraft according to claim 1, wherein the flight control surface is a flap.

6. The aircraft according to claim 5,
wherein the end surface of the flap is inclined with respect to both of the first direction and the second direction,
the portion of the main wing facing the end surface is also inclined with respect to both of the first direction and the second direction in accordance with the end surface, and
an inclination angle $\theta 2$ of the end surface and the portion with respect to the second direction is larger than an inclination angle $\theta 1$ of the end surface and the portion with respect to the first direction.

7. The aircraft according to claim 1, wherein the flight control surface is a slat.

8. The aircraft according to claim 1, wherein the end surface is formed by an end rib that is arranged at an end portion in the longitudinal direction of the flight control surface.

9. The aircraft according to claim 1, wherein the end surface is formed to be flat without providing a member projecting from the end surface.

10. The aircraft according to claim 1, wherein the end surface of the flight control surface and the portion of the main wing are configured so that a wider clearance than that in the non-deployment is ensured between the end surface of the flight control surface and the portion of the main wing when the flight control surface performs a deployment operation.

11. The aircraft according to claim 1, wherein the flight control surface is an outboard flap.

12. The aircraft according to claim 11,
wherein the end surface of the outboard flap is inclined with respect to an aircraft axis direction such that an aft portion of the end surface is outboard with respect to a forward portion of the end surface, and
the end surface of the outboard flap is inclined with respect to a thickness direction of the outboard flap such that a lower portion of the end surface is outboard with respect to an upper portion of the end surface.

13. An aircraft comprising:
a main wing; and
a flight control surface that is deployed from the main wing in a first direction and in a second direction different from the first direction, the flight control surface having an end surface on at least one side of a longitudinal direction of the flight control surface, the end surface facing a portion of the main wing when the flight control surface is not deployed,
wherein the first direction is either a direction from a nose side to a tail side of the aircraft or a direction from the tail side to the nose side of the aircraft,
the second direction is a direction from an upper surface side to a lower surface side of the main wing, and
only one of the end surface and the portion of the main wing is inclined with respect to the second direction.

14. The aircraft according to claim 13, wherein the flight control surface is a flap.

15. The aircraft according to claim 14, wherein the end surface of the flap is inclined with respect to both of the first direction and the second direction.

16. The aircraft according to claim 13, wherein the flight control surface is a slat.

17. The aircraft according to claim 13, wherein the end surface is formed by an end rib that is arranged at an end portion in the longitudinal direction of the flight control surface.

18. The aircraft according to claim 13, wherein the end surface is formed to be flat without providing a member projecting from the end surface.

19. The aircraft according to claim 13, wherein the end surface of the flight control surface and the portion of the main wing are configured so that a wider clearance than that in the non-deployment is ensured between the end surface of the flight control surface and the portion of the main wing when the flight control surface performs a deployment operation.

20. An aircraft comprising:
a main wing; and
a flight control surface that is deployed from the main wing in a first direction and in a second direction different from the first direction, the flight control surface having an end surface on at least one side of a longitudinal direction of the flight control surface, the end surface facing a portion of the main wing when the flight control surface is not deployed,
wherein at least one of the end surface of the flight control surface and the portion of the main wing is inclined with respect to both the first direction and the second direction.

* * * * *